United States Patent
Leiber

(10) Patent No.: US 12,358,480 B2
(45) Date of Patent: Jul. 15, 2025

(54) REDUNDANT BRAKING SYSTEM HAVING PRESSURE SUPPLY FOR ELECTRIC VEHICLES AND VEHICLES HAVING AUTONOMOUS DRIVING OF LEVEL 3 (HAD) TO LEVEL 4 (FAD)

(71) Applicant: IPGATE AG, Pfäffikon/Sz (CH)

(72) Inventor: Thomas Leiber, Rogoznica (HR)

(73) Assignee: IPGATE AG, Pfäffikon (CH)

( * ) Notice: Subject to any disclaimer, the term of this patent is extended or adjusted under 35 U.S.C. 154(b) by 0 days.

(21) Appl. No.: 18/666,153

(22) Filed: May 16, 2024

(65) Prior Publication Data

US 2024/0300464 A1 Sep. 12, 2024

Related U.S. Application Data

(63) Continuation of application No. 17/415,246, filed as application No. PCT/EP2019/086869 on Dec. 20, 2019.

(30) Foreign Application Priority Data

Dec. 20, 2018 (DE) ............ 10 2018 133 218.1
Jul. 10, 2019 (DE) ............ 20 2019 107 191.5
Aug. 30, 2019 (DE) ............ 20 2019 107 193.1

(51) Int. Cl.
*B60T 13/74* (2006.01)
*B60T 13/58* (2006.01)

(52) U.S. Cl.
CPC .......... *B60T 13/588* (2013.01); *B60T 13/745* (2013.01); *B60T 2270/402* (2013.01)

(58) Field of Classification Search
CPC .... B60T 13/745; B60T 13/686; B60T 13/662; B60T 13/588; B60T 8/4081; B60T 2270/402; B60T 2270/60; B60T 2270/604; B60T 2270/608
See application file for complete search history.

(56) References Cited

U.S. PATENT DOCUMENTS 6,318,817 B1 11/2001 Martin et al.
6,508,523 B2 1/2003 Yoshino
(Continued)

FOREIGN PATENT DOCUMENTS

AT 12010 U2 9/2011
CN 103303292 A 9/2013
(Continued)

OTHER PUBLICATIONS

Int'l Search Report and Written Opinion issued Feb. 19, 2020 in Int'l Application No. PCT/EP2019/086869, translation of Int'l Search Report only.
(Continued)

*Primary Examiner* — Bradley T King
(74) *Attorney, Agent, or Firm* — Panitch Schwarze Belisario & Nadel LLP

(57) ABSTRACT

A brake system for a vehicle may contain redundant components that permit braking force to be applied in case of partial or complete failure of a primary braking mechanism. The system may include at least one hydraulic brake circuit having at least one hydraulically operating wheel brake; a pressure supply device driven by an electric-motor drive; at least one electronic control and regulating device; a valve assembly having valves for setting wheel-specific brake pressures and/or for (dis)connecting the wheel brakes (from) to the pressure supply device; a piston-cylinder unit actuable by an actuating device, which can be connected to the at least one hydraulic brake circuit, to at least one brake unit comprising an electric drive motor, to an electric parking brake, to a hydraulically supported electromechanical brake, and/or to an electromechanical brake; at least one electric drive motor for at least one axle or wheel; and a central control unit.

17 Claims, 18 Drawing Sheets

(56) References Cited

U.S. PATENT DOCUMENTS

Figure 1:
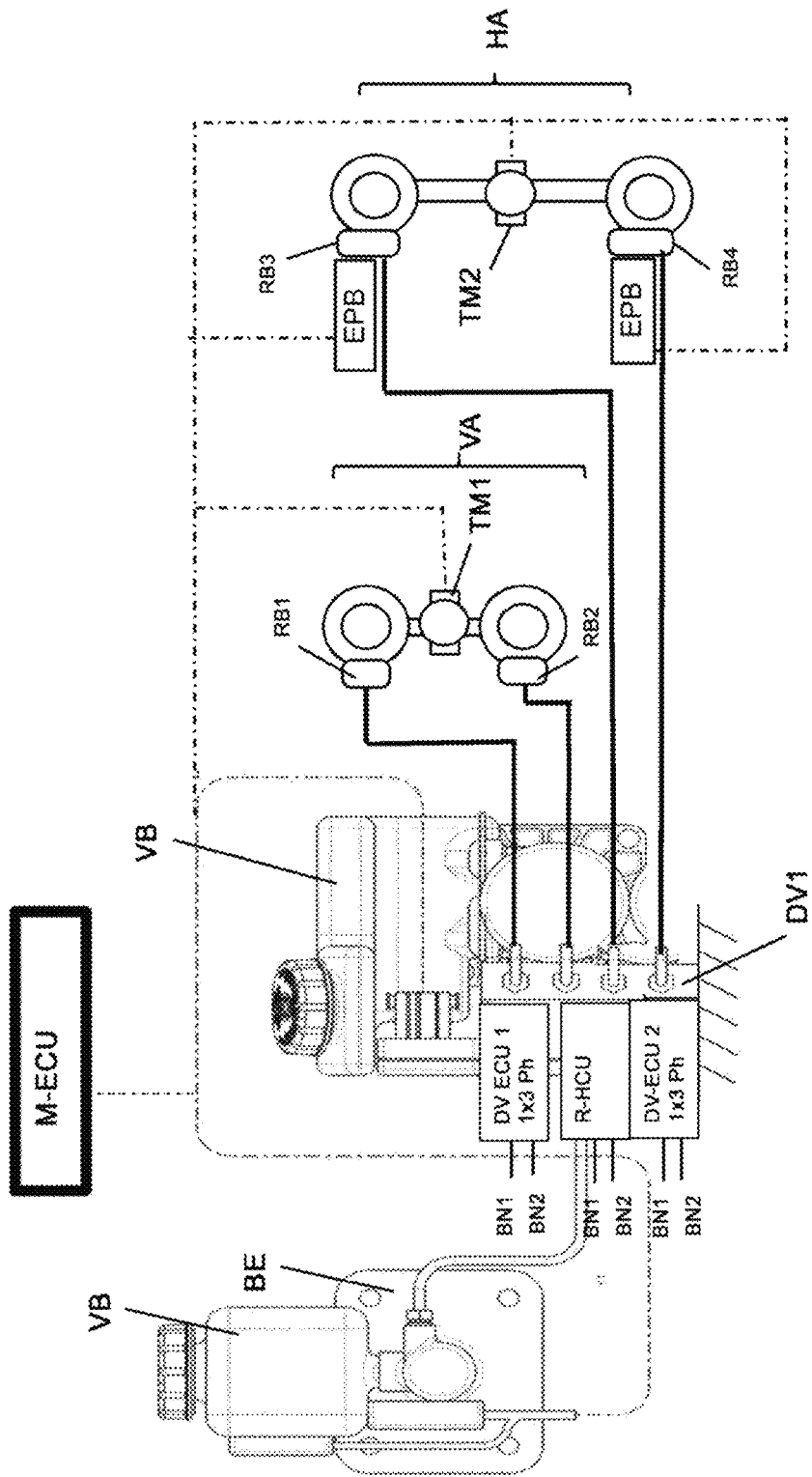

| | | | |
|---|---|---|---|
| 7,872,389 B2 | 1/2011 | Leiber | |
| 8,931,856 B2 | 1/2015 | Okano et al. | |
| 9,145,119 B2 | 9/2015 | Biller et al. | |
| 9,205,824 B2 | 12/2015 | Feigel et al. | |
| 9,296,370 B2 | 3/2016 | McClain et al. | |
| 9,415,758 B2 | 8/2016 | Drumm et al. | |
| 10,137,877 B2 | 11/2018 | Feigel et al. | |
| 10,358,119 B2 | 7/2019 | Besier et al. | |
| 10,821,949 B2 | 11/2020 | Henriques et al. | |
| 11,648,924 B2 | 5/2023 | Maj et al. | |
| 2003/0038541 A1 | 2/2003 | Suzuki et al. | |
| 2004/0090115 A1 | 5/2004 | Inoue et al. | |
| 2005/0159871 A1* | 7/2005 | Nakamura | B60K 6/52 303/121 |
| 2007/0241611 A1 | 10/2007 | Shimada et al. | |
| 2008/0093179 A1 | 4/2008 | Jager et al. | |
| 2008/0197738 A1 | 8/2008 | Leiber et al. | |
| 2009/0115247 A1 | 5/2009 | Leiber et al. | |
| 2010/0198475 A1* | 8/2010 | Stolzl | B60W 30/18127 303/3 |
| 2010/0206673 A1 | 8/2010 | Hitzel et al. | |
| 2010/0270854 A1 | 10/2010 | Okano et al. | |
| 2010/0282549 A1 | 11/2010 | Feigel et al. | |
| 2011/0024249 A1 | 2/2011 | Nishikawa et al. | |
| 2011/0115282 A1 | 5/2011 | Dinkel et al. | |
| 2011/0241417 A1 | 10/2011 | Miyazaki et al. | |
| 2012/0013173 A1 | 1/2012 | Leiber et al. | |
| 2012/0018262 A1* | 1/2012 | Winkler | F16D 65/18 188/106 F |
| 2012/0130581 A1* | 5/2012 | Semsey | B60T 8/17555 701/22 |
| 2012/0212044 A1 | 8/2012 | Nakamura et al. | |
| 2013/0062932 A1 | 3/2013 | Yagashira | |
| 2013/0127236 A1 | 5/2013 | Hakiai et al. | |
| 2013/0181506 A1 | 7/2013 | Weiberle et al. | |
| 2013/0204502 A1 | 8/2013 | Biller et al. | |
| 2014/0095042 A1 | 4/2014 | Sakashita et al. | |
| 2014/0152085 A1 | 6/2014 | Biller et al. | |
| 2014/0203626 A1 | 7/2014 | Biller et al. | |
| 2014/0216866 A1 | 8/2014 | Feigel et al. | |
| 2015/0151726 A1 | 6/2015 | McClain et al. | |
| 2015/0266457 A1 | 9/2015 | Johnson et al. | |
| 2016/0009263 A1* | 1/2016 | Feigel | B60T 11/224 303/15 |
| 2016/0009267 A1 | 1/2016 | Lesinski, Jr. | |
| 2016/0023644 A1 | 1/2016 | Feigel et al. | |
| 2016/0159225 A1 | 6/2016 | Nakatsu | |
| 2016/0167632 A1 | 6/2016 | Deng et al. | |
| 2016/0264113 A1* | 9/2016 | Feigel | B60T 8/4086 |
| 2016/0347298 A1 | 12/2016 | Jung | |
| 2016/0355171 A1 | 12/2016 | Mannherz et al. | |
| 2017/0072920 A1 | 3/2017 | Besier et al. | |
| 2017/0246957 A1 | 8/2017 | Ienaga et al. | |
| 2017/0274884 A1 | 9/2017 | Besier et al. | |
| 2017/0282877 A1 | 10/2017 | Besier et al. | |
| 2017/0361825 A1 | 12/2017 | Drumm et al. | |
| 2018/0126971 A1 | 5/2018 | Leiber et al. | |
| 2018/0162332 A1 | 6/2018 | Nakazawa et al. | |
| 2019/0016321 A1 | 1/2019 | Dinkel | |
| 2019/0039579 A1 | 2/2019 | Ohkubo | |
| 2019/0308601 A1 | 10/2019 | Maj et al. | |
| 2019/0344767 A1 | 11/2019 | Bareiss et al. | |
| 2019/0344769 A1 | 11/2019 | Zimmermann et al. | |
| 2020/0139949 A1 | 5/2020 | Dolmaya et al. | |
| 2020/0262399 A1* | 8/2020 | Yokoyama | B60T 8/00 |
| 2020/0361439 A1 | 11/2020 | Neu et al. | |
| 2021/0070267 A1 | 3/2021 | Weh et al. | |
| 2021/0245757 A1 | 8/2021 | Imamura et al. | |
| 2022/0063600 A1 | 3/2022 | Inoue | |
| 2022/0289161 A1 | 9/2022 | Leiber | |
| 2024/0017725 A1 | 1/2024 | Miyake et al. | |
| 2024/0100957 A1 | 3/2024 | Andreasson et al. | |

FOREIGN PATENT DOCUMENTS

| | | | |
|---|---|---|---|
| CN | 104203665 A | 12/2014 | |
| CN | 105026232 A | 11/2015 | |
| CN | 105683008 A | 6/2016 | |
| CN | 108025714 A | 5/2018 | |
| DE | 4335769 C1 | 12/1994 | |
| DE | 4413579 A1 | 10/1995 | |
| DE | 102007015809 A1 | 10/2008 | |
| DE | 102008051350 A1 * | 4/2009 | ......... F16H 25/2238 |
| DE | 102010038555 A1 | 2/2012 | |
| DE | 102011084206 A1 | 4/2012 | |
| DE | 102013224313 A1 | 9/2014 | |
| DE | 102013217954 A1 | 3/2015 | |
| DE | 102013224776 A1 | 6/2015 | |
| DE | 102015206572 A1 | 11/2015 | |
| DE | 202015008975 U1 | 6/2016 | |
| DE | 202015008976 U1 | 7/2016 | |
| DE | 102015103858 A1 | 9/2016 | |
| DE | 102015210433 A1 | 12/2016 | |
| DE | 112009005541 B3 | 8/2017 | |
| DE | 102016203563 A1 | 9/2017 | |
| DE | 102016213994 A1 | 2/2018 | |
| DE | 102016225537 A1 | 6/2018 | |
| DE | 102017222450 A1 | 7/2018 | |
| DE | 102005055751 B4 | 9/2018 | |
| DE | 102017204157 A1 | 9/2018 | |
| DE | 102005018649 B4 | 10/2018 | |
| DE | 102017003654 A1 | 10/2018 | |
| DE | 102017111077 A1 | 11/2018 | |
| DE | 102017207954 A1 | 11/2018 | |
| DE | 102017114556 A1 | 1/2019 | |
| DE | 102018202885 A1 | 8/2019 | |
| EP | 1874602 B1 | 12/2012 | |
| EP | 1759447 B1 | 7/2013 | |
| EP | 2396202 B1 | 4/2015 | |
| EP | 3208162 A1 | 8/2017 | |
| EP | 3271221 A2 | 1/2018 | |
| JP | 2013010469 A | 1/2013 | |
| WO | 2006111392 A1 | 10/2006 | |
| WO | 2012049134 A1 | 4/2012 | |
| WO | 2012059175 A1 | 5/2012 | |
| WO | 2013140221 A1 | 9/2013 | |
| WO | 2015032637 A1 | 3/2015 | |
| WO | 2016146223 A2 | 9/2016 | |
| WO | 2017058707 A1 | 4/2017 | |
| WO | 2018130481 A1 | 7/2018 | |

OTHER PUBLICATIONS

Int'l Search Report and Written Opinion issued Jun. 29, 2020 in Int'l Application No. PCT/EP2019/086864, translation of Int'l Search Report only.

Search Report issued Oct. 2, 2019 in DE Application No. 10 2018 133 189.4.

Search Report issued Oct. 2, 2019 in DE Application No. 10 2018 133 218.1.

Office Action issued Feb. 17, 2023 in Chinese Application No. 201980092234.4 (English Translation).

Office Action issued May 19, 2023 in Chinese Application No. 201980092235.9 (English Translation).

Office Action issued Jul. 29, 2023 in Chinese Application No. 201980092234.4 (English Translation).

Extended European Search Report issued Jun. 13, 2023 in EP 23161067.6.

Office Action issued Jun. 6, 2024 in U.S. Appl. No. 17/415,246.

Office Action issued Apr. 26, 2024 in U.S. Appl. No. 17/415,196.

Office Action issued Oct. 10, 2024 in U.S. Appl. No. 17/415,196.

Extended European Search Report issued on Jan. 16, 2025, in EP Application No. 24189574.7.

Final Office Action issued on Dec. 2, 2024 in U.S. Appl. No. 17/415,246.

Office Action issued on Jan. 28, 2025, in U.S. Appl. No. 17/415,196.

* cited by examiner

| State | Pressure supply (DV) | Use of outlet valves (AV) | Actuating unit (BE) | Electric drive motors TM1, TM2 | H-EMB EPB |
|---|---|---|---|---|---|
| Normal operation | 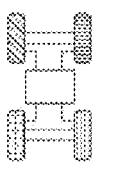 Max. power | Use of AV in special situations high-m ABS (pressure reduction via AV), i.e., the brake circuit is very rarely opened and is closed 90-99% of the time | Pedal feel constant | • Recuperation matched to pressure control DV<br>• Braking torque increase | |
| Fault 1: Failure 3-phase of the motor of the DV | 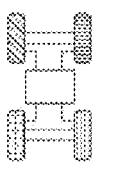 Reduced power operation with higher pressures | Use of AV to improve the control dynamics of MUX operation (pressure reduction via AV) | Pedal feel constant | • Recuperation matched to pressure control DV<br>• Braking torque increase to ensure that the locking pressure is reached |  Braking torque support for rear axle |
| Error 2: Complete failure of pressure supply | | | Brake force deceleration up to 0.6 g on the front axle by pedal actuation | 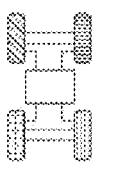 Deceleration by means of TM on the front axle and/or rear axle | 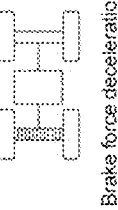 Wheel-specific control for steering and braking |
| Fault 3: Pressure transducer failure |  Regulation and diagnosis with current and path control | | | | |
| Fault 4: Air in hydraulics | 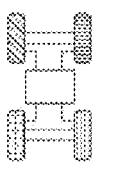 Subsequent delivery of volume from reservoir | | | | |

Figure 7

Figure 8

REDUNDANT BRAKING SYSTEM HAVING PRESSURE SUPPLY FOR ELECTRIC VEHICLES AND VEHICLES HAVING AUTONOMOUS DRIVING OF LEVEL 3 (HAD) TO LEVEL 4 (FAD)

CROSS-REFERENCE TO RELATED APPLICATION

This application is a continuation of U.S. patent application Ser. No. 17/415,246, filed on Jun. 17, 2021, which is a Section 371 of International Application No. PCT/EP2019/086869, filed Dec. 20, 2019, which was published in the German language on Jun. 25, 2020 under International Publication No. WO 2020/128080 A1, which claims priority under 35 U.S.C. § 119(b) to German Patent Application No. 10 2018 133 218.1, filed Dec. 20, 2018, German Patent Application No. 20 2019 107 191.5, filed Jul. 10, 2019, and German Patent Application No. 20 2019 107 193.1, filed Aug. 30, 2019, the disclosures of which are incorporated herein by reference.

The present invention relates to a device for a hydraulic actuation system for a brake for electric vehicles and in particular vehicles with highly automated driving (HAD) or fully automated driving (FAD)

PRIOR ART

The automotive industry is undergoing a disruptive change process. In addition to the increasing market penetration of electric vehicles, various stages of automated driving are being passed through, these are initially: Level 3—highly automated driving—HAD, level 4—fully automated driving—FAD, and level 5—autonomous driving—AD with each level increasing the demands on the braking systems used.

This has driven the development of new braking systems forward. The replacement of vacuum brake boosters with electric brake boosters (e-BKV) began in 2005 after initial approaches [ATZ edition June 11] with the market launch of what are termed 2-box solutions with electrical slave brake boosters and an additional ESP unit in 2013 [ATZ edition April 18] followed shortly by the first integrated 1-box systems with pedal simulators in 2017 [Bremsenhandbuch—Chapter 20]. Solutions for level 3 (HAD) are currently being developed.

From level 3 (HAD), a redundant pressure supply is mandatory for the first time. In addition, a connection between the brake circuits and the reservoir should be avoided as far as possible in the case of open brake systems and pedal feel simulators with constant pedal characteristics should be used. A redundancy of the ABS function must also be provided. This is implemented in what are termed 2-box systems with electric brake boosters and ESP/ABS unit according to the prior art according to DE 11 2009 005 541 B3 in such a way that the electric brake booster (e-BKV) takes over a pressure modulation function in the event of failure of the ESP unit in order to always ensure high vehicle deceleration. In the first step, what is termed a "ABS select-low control" was introduced.

From level 4 (FAD), 3-fold redundancies are expected for sufficient system availability, e.g., with the pedal sensors with the rule "2 out of 3". In addition, a pedal simulator is essential because of the increasing recuperation performance of electric vehicles and a lack of acceptance of changes in the pedal characteristics because fully automatic driving (FAD) can be operated over a longer period of time and the vehicle driver is not prepared for a change in the pedal characteristics when switching to piloted driving. To monitor the pressure supply, a redundant pressure transducer must be provided or an alternative diagnostic option must be provided. A redundant ABS function with at least individual axle control will also be required and partial redundancies will be introduced. Braking systems with closed brake circuits in ABS operation have safety advantages.

In level 5 (AD), the pedal position sensor and pedal simulator and their characteristics are no longer relevant. In contrast, the remaining components and subsystems will have triple redundancy, with the rule "2 out of 3" for sensors, control and regulating units ECU and part-ECU, or multiple redundancy. In addition, complete redundancy must be provided for the wheel-specific control.

Several new vehicle manufacturers such as Apple, Uber and Waymo are working on completely autonomous vehicles without a vehicle driver, which in the first expansion stage have a brake pedal with a simple pedal feel simulator unit (level 4 FAD) and in the last expansion stage (level 5 AD) should no longer have a brake pedal. In addition, vehicles with powerful electric drive motors on both the rear and front axles are becoming increasingly popular.

In addition to the electrohydraulic braking systems described, the electromechanical brake (EMB, electromechanical wedge brake) is a known solution. The EMB has not caught on in the past due to safety concerns and high costs. The high costs are due in particular to the fact that an electric motor and a complex electromechanical mechanism are required for each wheel brake. In addition, an EMB has a large number of electrical contact points, which are known to be more prone to faults than hydraulic lines.

For reasons of cost and reliability, braking systems for the FAD and AD levels cannot exclusively have EMB or wedge brakes. An EMB is only suitable for the rear axle of a vehicle because the rear axle has a smaller share of the braking force and a failure is not viewed as critically as on the front axle. A hydraulic braking system with control in the predominantly closed brake circuit via an electrically driven piston-cylinder unit is thus preferred.

In DE 10 2005 055 751 B4 and DE 10 2005 018 649 B4, the high-precision piston pressure control (PPC) is implemented by means of an electrically driven piston-cylinder unit having a spindle drive. The pressure is controlled using a non-linear map, what is termed the pressure-volume characteristic, in which the relationship between pressure and piston position is evaluated. Alternatively or additionally, the pressure is used by phase current control of the electric motor, the physical relationship of proportionality between current to torque and, due to a known piston area and fixed gear ratio, proportionality between current and pressure also existing and being used. With these two parameters, the pressure and the pressure change curve can be controlled very precisely.

In EP 1 874 602 B1 and EP 2 396 202 B1 what is termed the multiplex method (MUX) is described, which is particularly suitable for the requirements of levels 4 and 5 since a closed braking system, as explained later, does not have any dormant faults. In addition, a plurality of wheel brakes can be pressurized and depressurized with only one switching valve each, either simultaneously or one after the other. The high dynamic demands on the electric motor are disadvantageous, in particular if all wheel brakes are controlled by one motor. This requires a special motor with a double air gap (EP 1 759 447 B1) or a motor with a very low inertial mass.

In WO201614622A2 a special valve circuit of switching valves is also implemented, where the interior of the switching valve is connected to the associated brake circuit via a hydraulic line and the valve seat compensation is connected to the associated wheel brake via a hydraulic line. This valve switching is particularly suitable for the MUX method with only one switching valve per brake circuit, since in the event of a fault the solenoid valve opens due to the pressure in the wheel brake and thus prevents the pressure from remaining locked in the wheel brake, which leads to undesired vehicle deceleration.

A further developed MUX method (MUX 2.0) with only one outlet valve per brake circuit is known from EP 3 271 221 A2. This means that the dynamic requirements for multiplex operation can be significantly reduced because pressure can also be reduced via outlet valves in situations with extremely high pressure change dynamic requirements and the braking system is operated in a closed brake circuit during normal operation. As a result, the dynamic demands on the electric motor can be significantly reduced or very good regulation can be achieved using the multiplex method.

An advantageous actuating unit (BE) with two path sensors and an elastic element acting therebetween is known from WO 2012 059 175 A1, with which differential paths and/or differential forces are measured and used by the control of the braking system. A braking system with such an actuating unit, supplemented by a pedal feel simulator, requires requirements for multiple redundancies of level 3 to level 5.

Certain components of braking systems are to be regarded as critical to safety. These are seals for pistons, solenoid valves and ball screw drives. Various faults and their effects are listed below:
  Piston: Piston seals can fail, although the leakage may not yet occur at low pressures, for example, but only at high pressures. Leakage leads to a failure of the piston function. Pistons are used in path simulators, pressure supplies and master brake cylinders (HZ) and can lead to pedal failure or failure of the pressure supply.
  Solenoid valves: Dirt particles can settle in the valve seat. If solenoid valves in an open braking system are connected to the reservoir, for example, particles can settle when they close and the connection is not tight. The tightness cannot be diagnosed when open.
  Ball screw drive: Ball screw drives wear out over their service life and can jam, in particular if dirt particles get into the ball screw drive. This can lead to failure of the pressure supply.

The requirements for level 3 (HAD), level 4 (FAD) and level 5 (AD) braking systems and for e-vehicles that have increasingly powerful electric drive motors on one or more axles can be summarized as follows:
  completely noiseless operation, i.e., no disturbing noises from units on the bulkhead;
  even shorter construction than conventional cars due to new vehicle platform concepts for electric vehicles;
  brake intervention for individual wheels or axles, even in the event of complete or partial failure of modules;
  functional scope ABS, ESP, ASR, recuperation and torque vectoring with the least possible restriction of performance even in the event of complete or partial failure of modules;
  maximum recuperation of the vehicle's kinetic energy through maximum utilization of the braking power by electric motors; therefore dynamic and precise control of the hydraulic braking system as required;
  use of available braking torques, e.g., from drive motors to simplify the braking systems or shorten the braking distance;
  increased safety through redundancy of the systems, signal transmission and power supply;
  diagnostic methods for detecting leaks or avoiding dormant faults;
  high demands on the control accuracy for further braking distance reduction, in particular when electric drive motors and hydraulic braking torques work together;
  high modularity of the systems, i.e., the use of the same parts/modules, in particular for the pressure supply; modularity is driven by a large number of vehicle drive concepts, in particular in the coexistence of vehicles with internal combustion engines, hybrid vehicles and pure electric vehicles (internal combustion engines, hybrid engines, pure electric vehicles, driverless vehicles).

Object of the Invention

The object of the present invention is to provide a braking system that meets the requirements of high availability in highly automated driving (HAD) and fully automated driving (FAD) and is also suitable for electric vehicles.

Achieving the Object

The object of the invention is achieved by a braking system having the features of claim 1. Advantageous designs of the braking system according to claim 1 result from the features of the dependent claims.

The invention is advantageously characterized in that the braking system according to the invention provides a sufficiently high redundancy of system-relevant components for highly automated, fully automated driving (HAD, FAD) and at the same time high synergy effects can be used in the interaction of the braking system with electric drive motors of electric vehicles. For example, the energy recovery of kinetic energy by the electric motor is not limited by the braking system as for example in the case of slave brake boosters without path simulator according to DE 11 2009 005 541 B3, while at the same time the electric motor can contribute to braking. The braking system according to the invention is advantageously equipped for HAD and FAD with an actuating unit (BE) with a pedal feel simulator.

For level 4 (FAD), an actuating unit with corresponding redundancies should be provided for fully automated driving. The actuating unit has a hydraulic connection to at least one brake circuit.

It is also advantageous to provide a central control and regulating unit (M-ECU) which is superordinate to the individual components of the braking system and controls them.

For the wheel-specific redundant brake control, the invention provides in a basic embodiment that a pressure supply device carries out the pressure control either in only one axle or in both axles of the vehicle. The pressure supply device advantageously has two mutually independent electronic control and regulating units or a double redundant control and regulating unit for controlling its electric-motor drive, so that if one control and regulating unit fails, the other still functional control and regulating unit can still control the drive.

Each of the two electronic control and regulating units advantageously controls winding or phase systems of the electric-motor drive that are separate from one another. This advantageously ensures that if a winding or phase system fails, the drive motor can at least still be operated with a reduced, for example half the maximum, torque. This design provides multiple redundancy at least for the pressure supply device and its control.

In a further embodiment, the pressure supply device, together with the valve assembly and the at least one electronic control and regulating unit assigned to the pressure supply device, can be combined to form a module or assembly. This results in a compact and inexpensive unit which can be accommodated and installed in the vehicle in a space-saving and simple manner.

In a further embodiment, the pressure supply device, together with the valve assembly and the at least one electronic control and regulating unit assigned to the pressure supply device, can be combined to form a module or assembly. A simple master brake cylinder or a tandem master cylinder, optionally with redundant seals, and an absolutely necessary path simulator can be provided here.

The braking systems described above advantageously regulate in control operation with a closed brake circuit, i.e., in control operation there is no pressure reduction via solenoid valves in the reservoir, and/or the pressure in the wheel brakes of the respective brake circuit is controlled or set using the multiplex method and/or simultaneously. To be on the safe side, the switching valves should be connected to the wheel brakes in such a way that they open automatically due to pressure in the wheel brake. This advantageously ensures that the brake pressure in the wheel brakes can be reduced in any case and undesired braking or locking of the wheels does not occur.

It is also advantageous if, in the braking systems described above, a pressure reduction in control operation takes place, especially with very high pressure dynamics requirements, e.g., with high-µ ABS control, in particular in the event of failure of a pressure supply device and/or an control and regulating device of a pressure supply in a wheel brake via the opening of an outlet valve in the reservoir, in particular in extended multiplex operation, what is termed the MUX 2.0 method, in which a pressure supply device for all wheel brakes take over the pressure control.

In an additional very advantageous design of the braking systems described above, at least one wheel brake, preferably two wheel brakes, is/are a hydraulically supported electromechanical brake (H-EMB), an electric parking brake (EPB) or an electromechanical brake (EMB). Similarly, in addition to a conventional hydraulic wheel brake, an electric motor, an additional parking brake or a hydraulically supported brake or electromechanical brake can have a braking effect on the wheel. This measure creates an additional redundancy. When a hydraulically supported electromechanical brake is provided, a braking force can advantageously be built up with this both hydraulically and electromechanically.

If at least one electric drive or traction motor is provided for at least one axle or wheel of the vehicle, this can also be used advantageously for braking an axle or a wheel. This provides an additional redundancy. In normal operation or if a component of the braking system, for example a pressure supply device, fails, a (supporting) braking force can also be produced by means of the traction motor(s). Through a combined use of the pressure supply device, hydraulically supported electromechanical brake(s) H-EMB, electric parking brake(s) EPB and/or electromechanical brake(s) EMB and/or one or a plurality of drive motors(s), a faster increase in braking force with a shorter time-to-lock (TTL) or a higher braking torque can advantageously take place in control operation or in the event of failure of one or a plurality of components of the braking system.

In the braking systems described above, the pressure supply device can advantageously be preceded by a separating valve at the outlet of the pressure supply, with the pressure supply device being able to be disconnected from the brake circuit(s) by closing the separating valve, in particular if it fails.

In order to make the braking system according to the invention even more secure against failure, at least one control and regulating device of a pressure supply device and valve assembly can have a separate voltage supply and/or signal transmission, in particular all modules of the pressure supply device can be supplied by at least two vehicle electrical systems and/or have redundant signal transmissions. Two vehicle electrical systems are understood to mean that either different voltage levels and/or voltage sources are used to supply the braking system.

It is also advantageous if, in the aforementioned possible embodiments of the braking system according to the invention, either the pressure control in a brake circuit is carried out using at least one pressure sensor and/or via the current measurement of the motor current of the drive and path control of the piston of the pressure supply device, which can be further refined in the pressure control quality by taking into account the temperature of the drive. This enables precise pressure control even without a pressure sensor, as has already been explained in detail in DE 10 2005 055 751 B4 by the applicant in function without a temperature sensor.

It is also advantageous if the piston-cylinder units of the braking system have redundant seals and hydraulic diagnostic lines and redundant control and regulating units are also provided, and that the drives of the pressure supply devices have 2×3 phases, and that by means of sensors of the motor current $i_{phase}$, the motor angle α, in particular the temperature T, is measured and taken into account in the pressure control, and that there is in particular a redundant supply via two vehicle electrical systems or voltage levels, and in that a redundant signal transmission is provided. The provision of all these measures advantageously results in a very safe system which is suitable for levels 3 and 4.

The above-described braking systems can advantageously be operated in such a way that the deceleration of the wheels is carried out by means of the pressure supply device, the electric drive motor(s) and the hydraulically supported electromechanical brake (H-EMB) at least for each axle, preferably for each wheel or the electromechanical brake (EMB). Torque vectoring can also be carried out by means of the pressure supply device(s), the electric drive motor(s) (TM) and the hydraulically supported electromechanical brake (H-EMB) or the electromechanical brake (EMB).

When using a temperature sensor, the temperature of the drive of the pressure supply device(s) can also be determined and the temperature can be used to more precisely determine the torque constant, which decreases linearly by the factor (1-Br %*ΔT) as a result of the temperature increase. This allows an even more precise control of the torque and thus of the pressure, as long as this is based on the phase current i, as the relationship torque=kt(T)*phase current i applies.

For pressure control, in addition to the current control, the piston position and the pressure volume characteristic can also be used and the change in the pressure volume characteristic in the case of, e.g., air inclusion, can be adjusted by the pressure sensor or the H-EMB. The combined use of the two methods described above results in a high-precision pressure control that is also possible without a pressure sensor. This method provides additional redundancy in the event of failure of pressure transducers or can also be used to simplify the system with low redundancy requirements (e.g., system with only one or without pressure transducers).

The braking system according to the invention can also be used for steering/torque vectors, wherein the wheel-specific control options with the at least one pressure supply and the hydraulically supported electromechanical brake(s) H-EMB, electrical parking brake(s) EPB and/or electromechanical brake(s) EMB and/or drive motors or the steering EPS can be used.

The invention is thus characterized by a very simple structure with very high availability, i.e., in the event of a complete or partial failure of modules, the function is not restricted or is restricted to a very small extent. Even if various components fail, almost maximum deceleration and driving stability can always be ensured. For this purpose, a deceleration of up to approximately 0.9 g and an axle-based control, preferably wheel-specific control with steering intervention/stability intervention is guaranteed even if a pressure supply device fails. A high level of availability and performance is thus achieved—once again collectively—through the following measures, which can be provided individually or in combination:

Mainly operation in the closed brake circuit (>90% of the operating time) both in the brake booster (e-BKV), recuperation operation and mainly in ABS control operation, thus avoiding dormant faults. If the system is operated in an open manner, for example in the ABS, it is hydraulically connected to the reservoir by opening an outlet valve of the wheel circuit, which makes undetected leaks in valves and seals (dormant faults) particularly difficult to detect. Therefore, the operating state should be avoided or a diagnosis of the tightness after every ABS operation is useful; a diagnosis can take place in such a way that, for example, when the valve is closed, the piston of the pressure supply is moved and a volume loss or pressure increase is determined and evaluated.

Redundancies and partial redundancies of the DV motor electronics: e.g., design of the motor of the DV as a 2×3 phase motor as well as partial redundancy of the motor control. This means that if one of the electronic components fails (winding short circuit, failure of a 3-phase line, the motor can still be operated with half the torque. With a design for 200 bar, 100 bar, i.e., approximately the blocking pressure, can then also be achieved in the event of failure. This means that even if one of the electronics fails, ABS operation with maximum performance with low coefficients of friction and satisfactory performance in road conditions with a high coefficient of friction is possible;

Partial redundancies of the electronics for the valve control. If the electronics fail, it is very advantageous for availability if the switching valves can still be operated. Thus, redundancy for the valve control is to be provided in the electronics so that the valve actuation still functions if the engine control fails;

Operation in closed MUX operation with switching valves and use of outlet valves (at least 1 AV per axle) in the event of a fault, i.e., failure or partial failure of a pressure supply. This means that the pressure control dynamics can still be maintained with low motor power, since the pressure can be both built up and reduced sequentially or simultaneously by the pressure supply, but pressure can also be reduced via outlet valves;

Use of an H-EMB, EMB or EPB in braking operation, in particular use of EPB or H-EMB in the event of module failure. This means that, on the one hand, the wheel can be braked via the hydraulic access and via the electric motor built into the H-EMB. The electric motor can be designed as an EC motor or a brush motor. Thus, braking support can be provided by the electric motor on the respective wheel;

Use of the used traction motors to increase the braking torque with simultaneous recuperation of kinetic vehicle energy. Due to the high inertia of the drive motor, however, it must be taken into account that a braking torque can be built up less dynamically via the traction motor than via the pressure supply and the H-EMB, EPB or EMB;

Use of a fail-safe and diagnosable actuating unit with pedal feel simulator, redundant displacement sensors and a force-displacement sensor (KWS) as well as a special circuit for diagnosing the pedal feel simulator;

Use of valves with a self-opening mechanism through the pressure trapped in the wheel brake, in particular in the de-energized state;

Use of a hydraulic fall-back level in a brake circuit or an axle via connection of the actuating unit via a switching valve FV;

Subsequent delivery of volume of the DV when the volume limit is reached;

Operation of the pressure position without pressure transducer through intelligent, precise torque estimation from the phase current, taking into account the motor temperature and the pressure volume characteristic, which is compared via a pressure transducer or the H-EMB function;

Switching from normal operation 2-wheel operation in the MUX method to 4-wheel operation in the MUX 2.0 method with AV in the event of failure of a DV Use of trapezoidal spindle (no blocking of the spindle by dirt particles in the raceway of the ball screw drive);

Self-locking trapezoidal spindle→dispensing with FV and TV.

Table 1 lists the various wheel control functions for normal operation (control operation) and four different fault cases fault 1 to fault 4.

Normal operation is shown and explained in the first line. The pressure supply device DV produces the maximum required control power. The outlet valves AV are not used for 90-99% of the control time and are only opened in extreme situations for rapid pressure reduction in the reservoir. Pedal feel is constant because brake-by-wire operation is completely decoupled. Energy is recuperated by means of the electric drive motors TM1 and TM2 and the pressure curve of the pressure supply is adapted to the torque curve over time of the drive motors in such a way that the vehicle driver cannot determine whether the electrohydraulic braking system is in use alone or together with recuperation.

In the event of fault F1, in which a 3-phase system of the drive of the pressure supply device DV has failed, the pressure supply device can still build up a brake pressure via the second 3-phase system and control the ABS control operation. The AV valves can be used to a greater extent here for pressure reduction control in order to avoid noticeable loss of performance in the ABS control. Electric drive motors are used to increase the braking torque because the pressure supply can only deliver half the pressure than in the normal state. In the case of powerful electric motors, the wheel locking pressure can thus be safely achieved.

In the event of fault F2, pressure supply by means of pressure supply device DV is no longer possible. In this case, the actuating device, by means of which a brake pressure for the wheel brakes can be built up, is used to decelerate the vehicle. In addition, the traction motors can be used to brake the vehicle. The hydraulically supported electromechanical brakes H-EMB or the purely electromechanical brakes EMB can also provide braking force to decelerate the vehicle.

In the case of fault 3, only the pressure sensor DG has failed, and pressure control is still possible via the measured motor current of the pressure supply device and path control using the pressure-volume characteristic, which can be further improved by temperature measurement. The diagnostic functions can also continue to run in the event of this fault.

In the case of fault 4, environmental influences (e.g., air bubbles) and wear result in a need for more brake fluid to be supplied to the brake circuits, which can be carried out at any time using the pressure supply device and does not affect the pedal feel.

Table 2 shows the brake and various dynamic control functions (electric brake booster e-BKV, ABS operation, steering/torque vectoring, stability control/ESP, recuperation and parking brake) which can be formed by the components pressure supply DV1, drive motor TM1, TM2, steering EPS and hydraulically supported H-EMB or parking brake EPB. Thus, the primary function and the secondary function/redundancy are identified. This makes it clear that the most important vehicle dynamics functions in the invention are at least double redundant and the system is therefore suitable for level 3 (HAD) and even level 4 (FAD).

The braking system can also be simplified in such a way that a very cost-effective system with lower redundancy requirements and a sensible combination of the primary supply device with the brake units, for example for BRIC countries such as India, Brazil, China, is derived from the system. Here, the redundancy of the pressure supply device with redundant ECU, e.g., 2×3 phases, is dispensed with and the hydraulic fall-back level via pressure production by the vehicle driver via the actuating unit and a deceleration by the electric motor TM is used. This means that even with a simple actuating unit with a piston (HZ), the current legal requirements for braking decelerations of up to 0.3-0.5 g for autonomous driving at levels 1 to 2 can be achieved. In addition, for example, the pressure transducer can be dispensed with and controlled exclusively according to the PPC method. This means that faults F1 and F3 can no longer occur. An electric parking brake can also be omitted if an H-EMB is used, or a hydraulically supported parking brake according to DE 10 2007 015809 is used and the pressure in the parking brake is locked in with a solenoid valve. If the hydraulic line fails or there is a leak, additional delivery can be made or a holding torque can still be produced via the traction motor.

It is also conceivable that the actuating unit can be omitted if the pressure supply is produced so reliably that a piston seal failure and blocking of the ball screw drive can be excluded with sufficient FIT rates.

The pressure supply device according to the invention can also be driven by a rotary pump, which can in particular be a gear pump. It can then have a motor housing with an electric-motor drive arranged therein, which drives the gear pump. The drive has a stator and a rotor for this purpose. An internal gear of the gear pump is moved via the rotor of the drive. According to the invention, the drive is designed as a dry runner by means of at least one seal, which is arranged between the rotor and the inner gear wheel, or has a dry running rotor, i.e., the medium conveyed by the gear pump does not flow around the rotor of the drive and/or is not surrounded by the medium. Due to the design as a dry runner, the rotor rotates without major friction and flow resistance, which means that higher speeds and better efficiency can be achieved.

A particularly compact and simple pressure supply device is obtained when the motor housing has a side wall on which the gear pump is arranged, in particular this has a recess in which the gear pump is at least partially or entirely inserted. The side wall of the motor housing can be penetrated by a shaft connected to the rotor in a rotationally fixed manner, the gear wheel either being connected to the shaft in a rotationally fixed manner or being coupled to the shaft via an interposed gear and/or a clutch.

An advantageous compact and integrated design of the pressure supply device described above is obtained if the drive with its housing rests against a hydraulic housing with at least one valve and/or hydraulic lines or channels arranged therein or forms a unit therewith. The side wall of the drive housing can abut or adjoin the side wall of the hydraulic housing, in particular be attached thereto, the particularly pot-shaped recess receiving the gear pump at least partially or completely and being open towards the hydraulic housing. With housings arranged next to one another, the gear pump can either rest entirely in the recess in the wall of the drive housing, entirely in a recess in the hydraulic housing or both in a recess in the side wall of the drive housing and in a recess in the side wall of the hydraulic housing. In the latter case, the openings of the two recesses then face one another. Additional seals can be provided in order to seal the two housings to one another and to the outside.

The above-described recess in the side wall of the drive housing is advantageously open to the outside and, if a hydraulic housing is present, opens thereto. The recess itself can advantageously be designed in the shape of a pot. It can also have a cylindrical section which is circular in cross-section and in which the gear pump rests with its gears.

The side wall of the drive housing can also advantageously be designed as a flange with which the drive can be fastened to another part or unit.

The gear pump used in the pressure supply device according to the invention can be an internal gear pump with a sickle, an external gear pump or a toothed ring pump.

The gear pump can also advantageously be arranged axially next to the stator and/or the rotor of the drive, if the structure and size thereof is not disadvantageously limited by the gear pump. The size and structure of the gear pump is then not dependent on the dimensions of the stator and the rotor.

The drive housing can be designed in at least two parts, the side wall being part of or forming a first housing part. The second housing part can, for example, be pot-shaped and accommodate the stator and the rotor of the drive.

As already stated, the rotor is connected to the gear by means of a drive shaft directly or via a transmission and/or a clutch. The gear can be connected to the drive shaft in a rotationally fixed manner either by means of a force-fit connection or by means of a form-fit connection, which is formed in particular by means of a pin or serration. In the gear ring pump, the inner gear is arranged eccentrically on a part connected to the drive shaft, in particular in the form of a disk or a cam disk.

Both when the gear pump of the pressure supply device according to the invention is designed as an internal gear pump or as a toothed ring pump, an external inner ring gear rim is also necessary in addition to the internal gear. In the case of the internal gear pump, the inner ring gear is rotated about its axis of rotation by means of the internal gear wheel driven by the drive shaft, the inner gear wheel being arranged eccentrically to the inner ring gear. The inner ring gear rotates in an outer ring or cylinder surrounding it. In addition, a sickle must be provided which must be arranged in the space between the inner ring gear and the inner gear wheel resulting from the eccentricity.

In contrast to the internal gear pump, the inner ring gear is fixedly arranged in the gear ring pump, the inner gear rolling, due to its eccentric mounting on the disk, being rotated by the drive shaft in the inner ring gear. A sickle as with the internal gear pump is not required.

According to the invention, the drive shaft can either be supported or mounted
- a) in the motor housing, on the one hand, and in the gear pump and/or in the hydraulic housing on the other hand, or
- b) only in the gear pump or
- c) in the hydraulic housing and in the motor housing or
- d) in the gear pump and in the hydraulic housing by means of suitable bearings, in particular radial bearings, in the form of ball or roller bearings and/or axial bearings.

If a hydraulic housing is provided, the drive shaft can extend into the hydraulic housing, in particular up to its side opposite the drive. For example, a target for a sensor can be arranged on the drive shaft, the sensor being arranged in the control and regulating unit (ECU). Additional seals can prevent the delivered medium from entering the control and regulating unit. It is also possible that the drive shaft extends right through the hydraulic housing and ends in the housing adjoining it, for example an control and regulating unit.

The gear pump can be designed differently as an internal gear pump. Thus, in a first embodiment, the inner gear, the inner ring gear, the sickle and the outer ring can be arranged between two disks, with the disks being firmly connected to the outer ring after appropriate centering and adjustment of the parts to one another. The cohesive connection can extend all the way around the circumference, resulting in a stable and compact embodiment in which the individual moving parts have only small clearances and gaps with one another, whereby good efficiency is achieved and high pressure can be achieved.

Possible embodiments of the braking system according to the invention are explained in more detail below with reference to drawings.

Figure 1A:
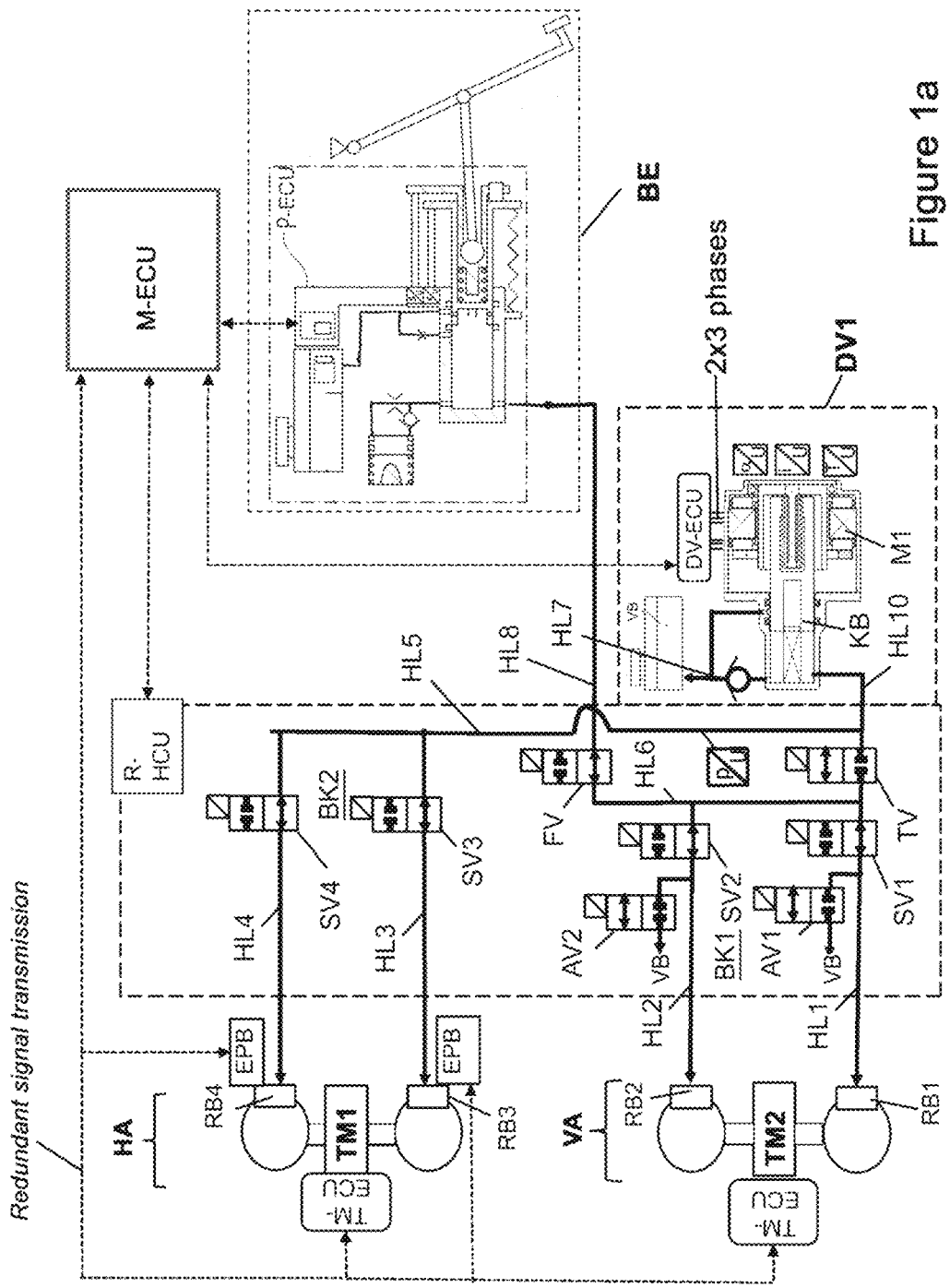
Figure 2:
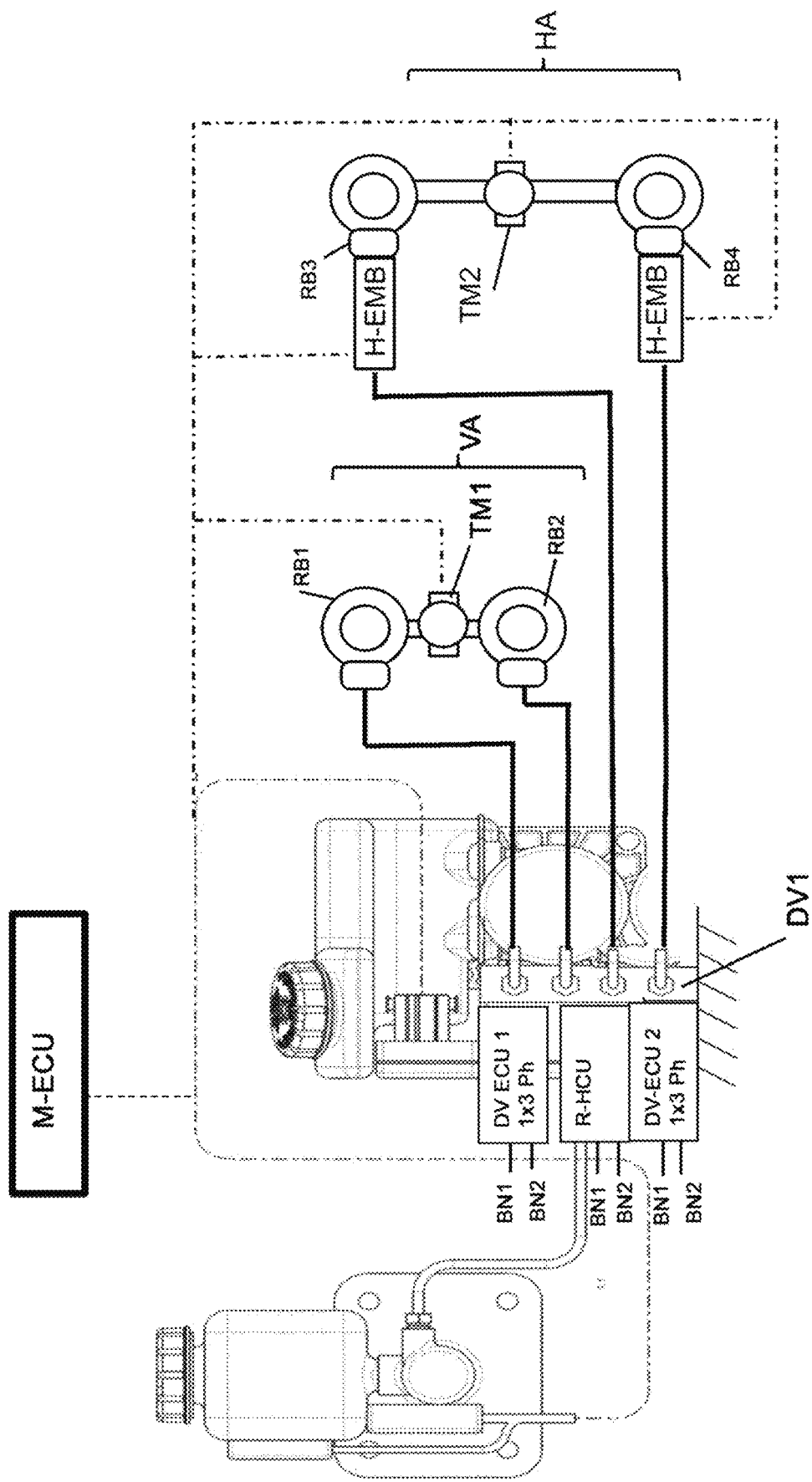
Figure 2A:
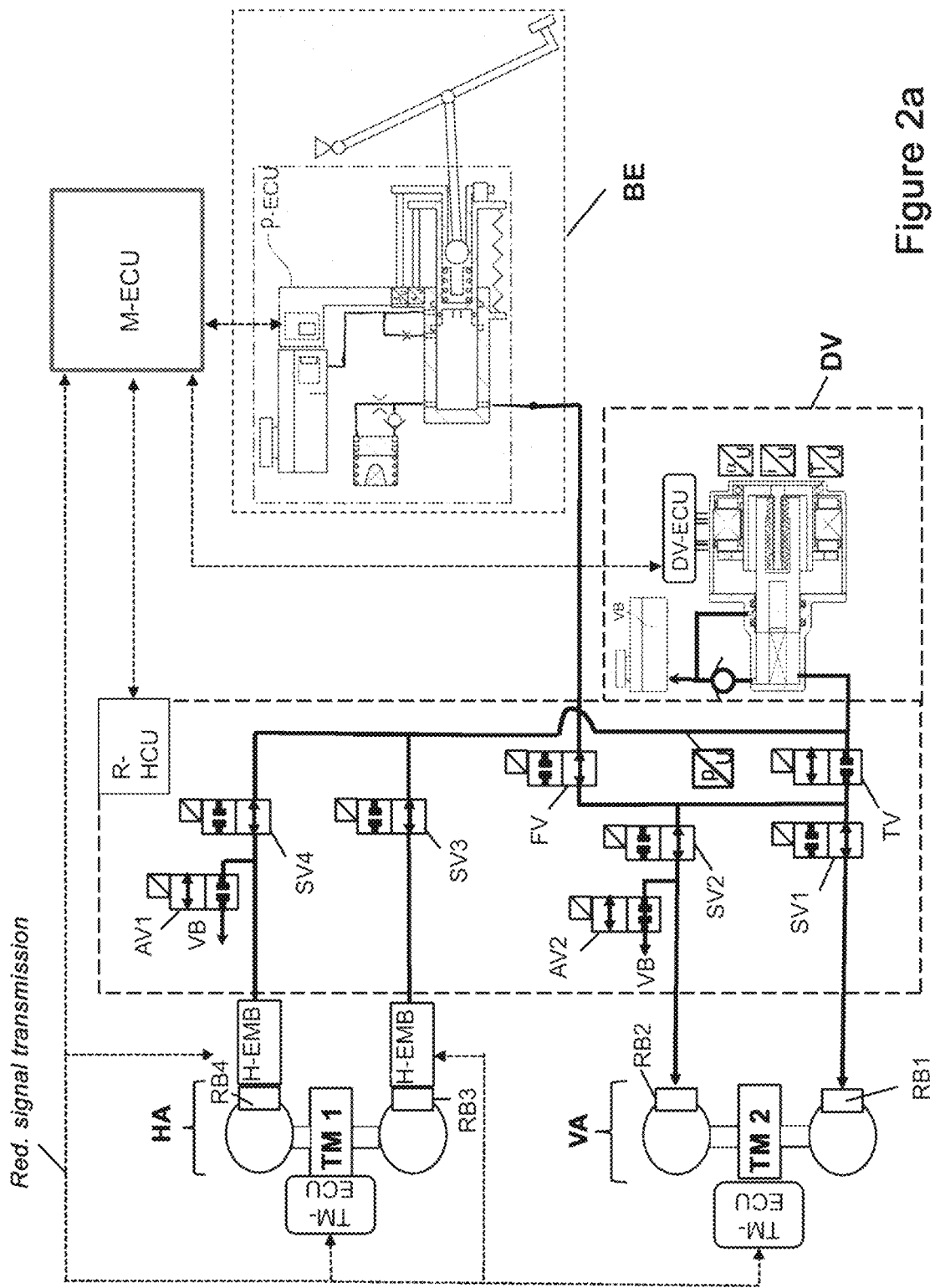
Figure 3:
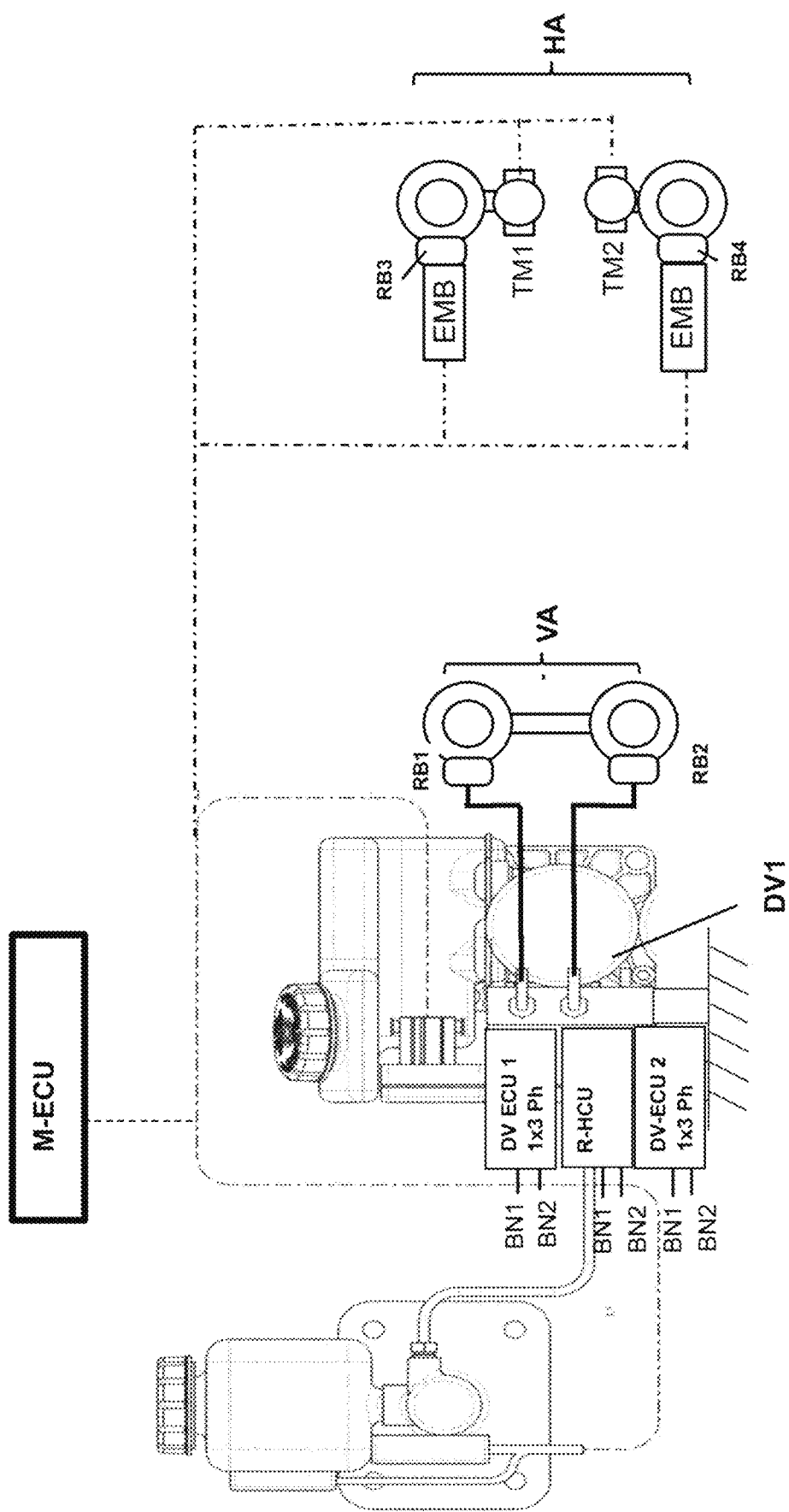
Figure 3A:
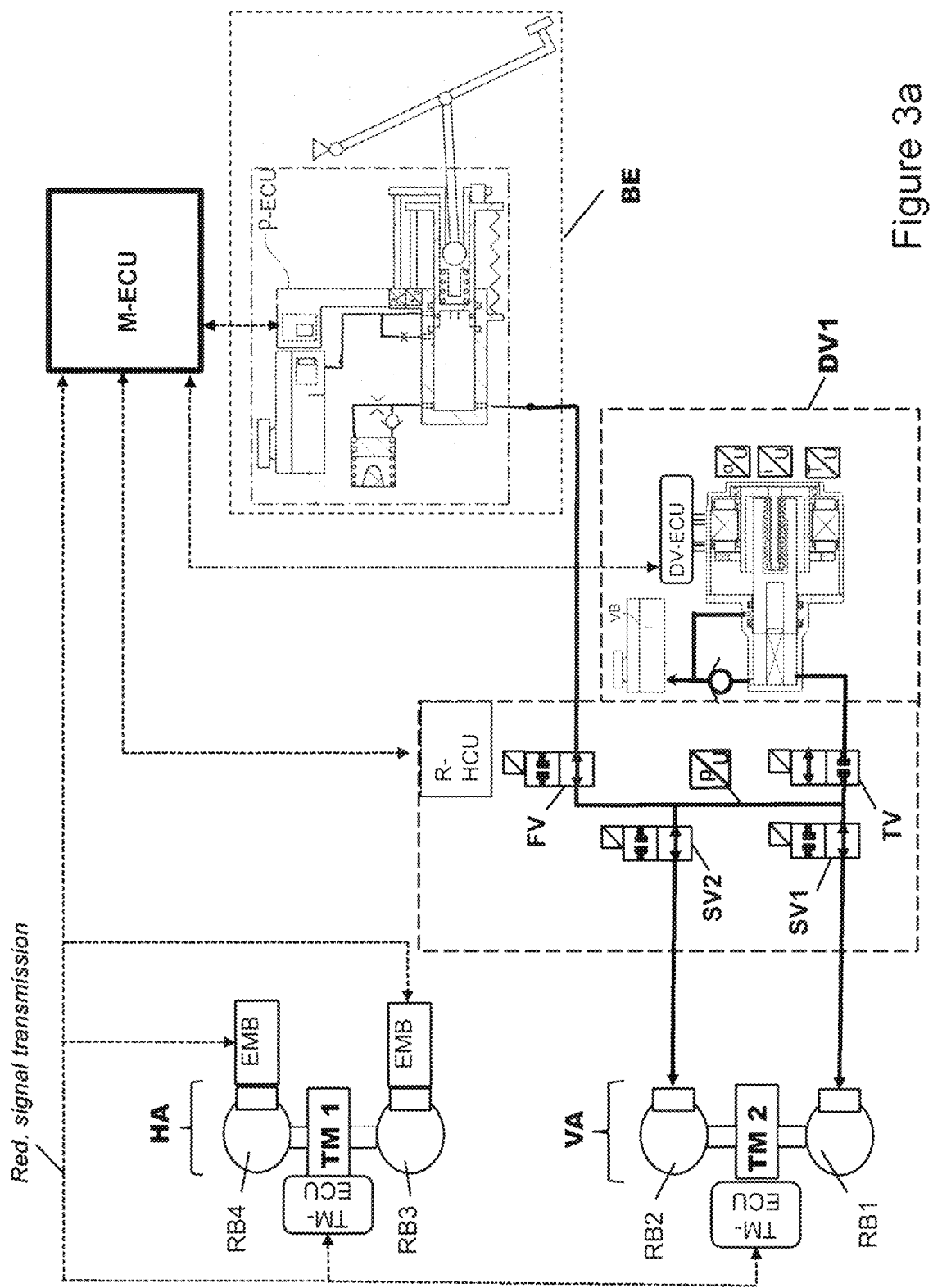
Figure 4A:
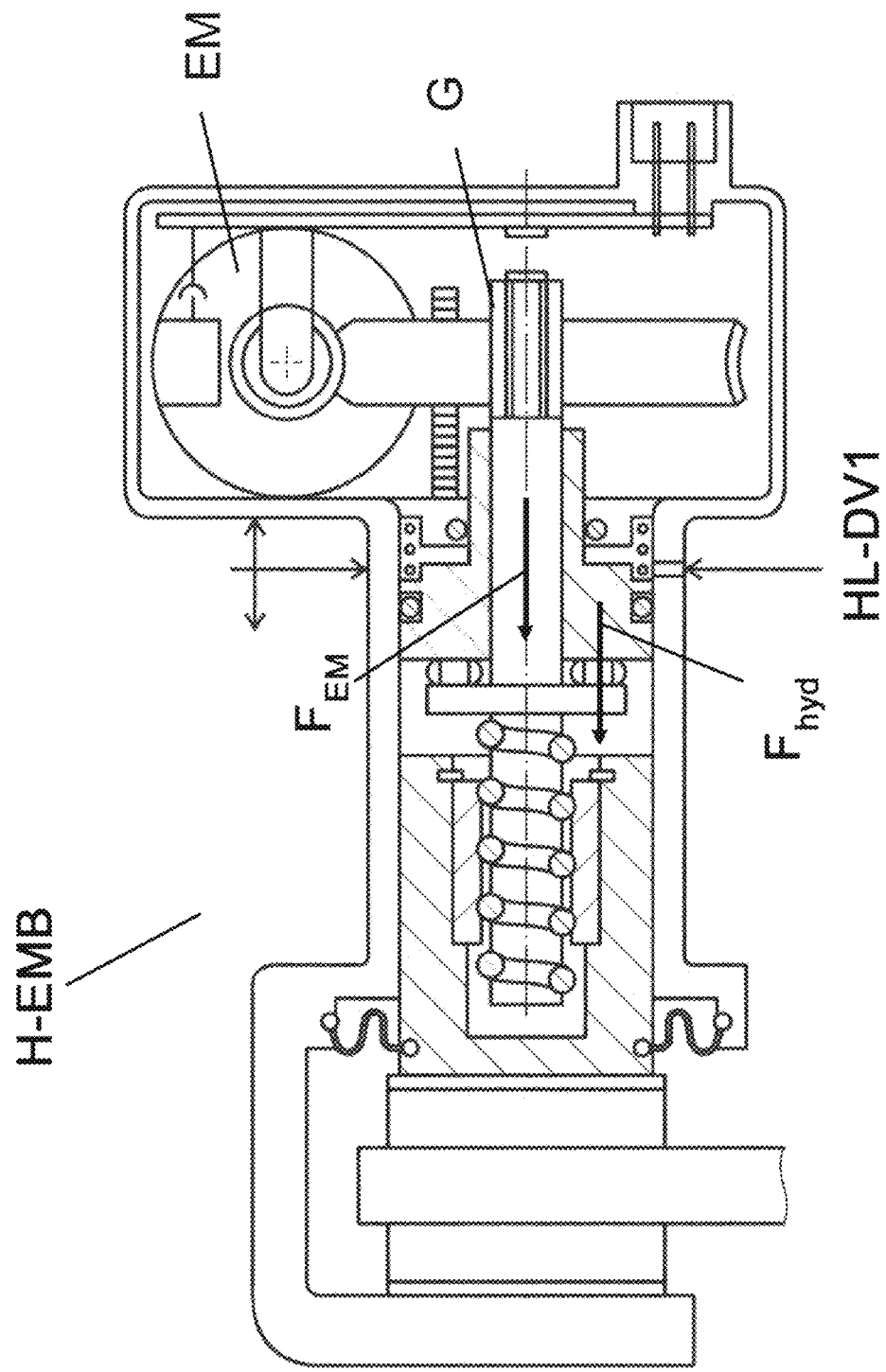
Figure 4B:
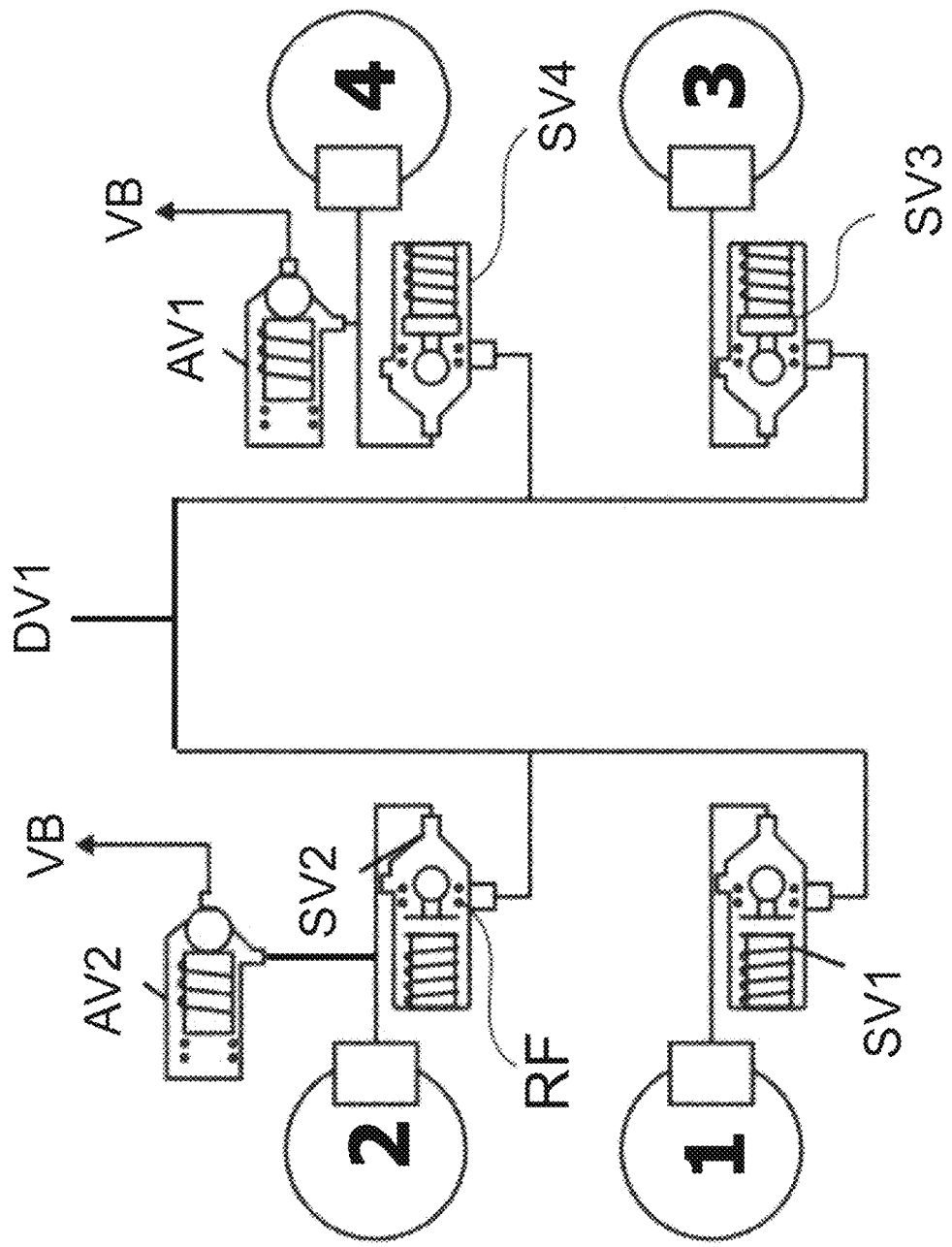
Figure 4C:
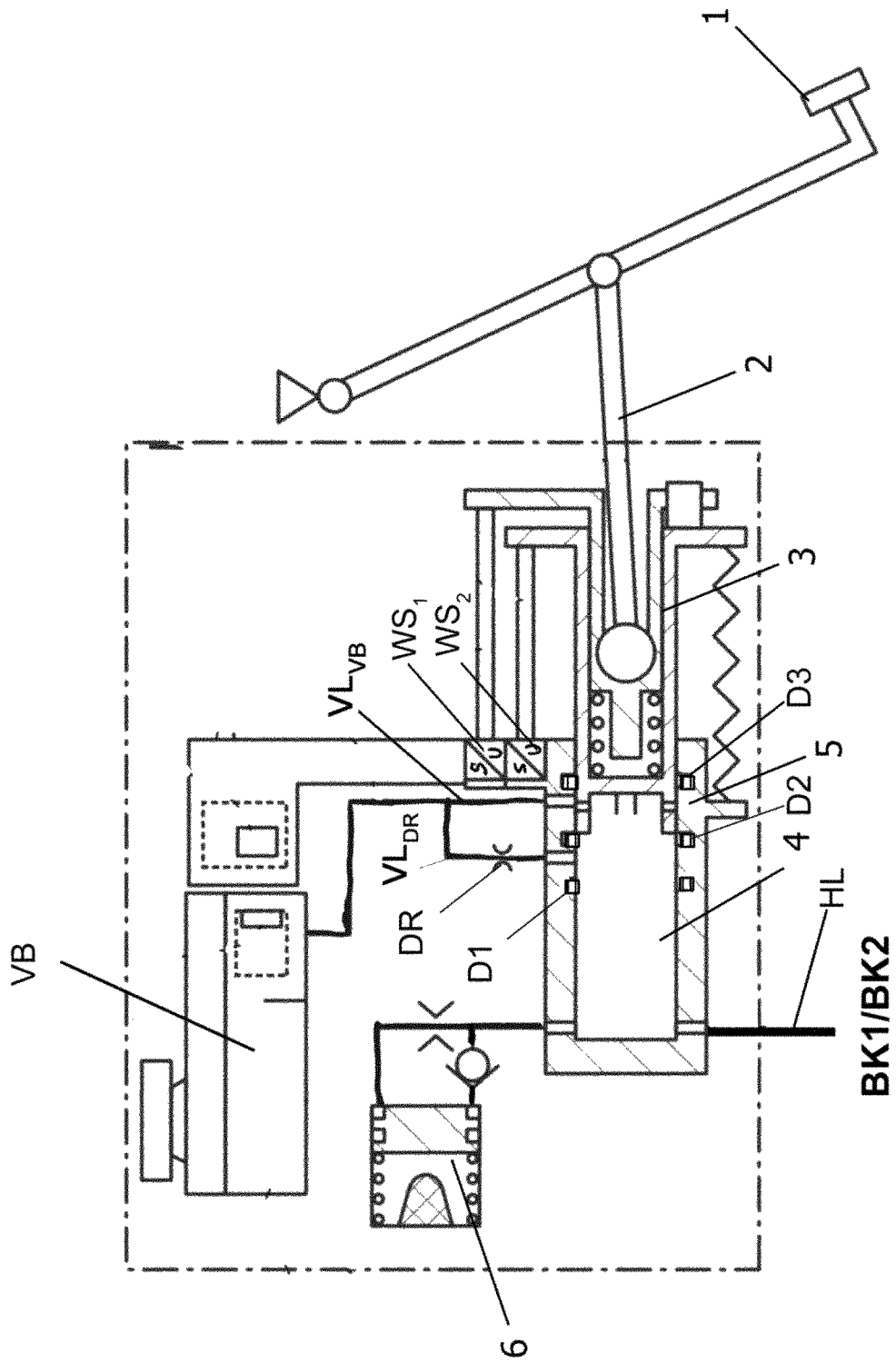
Figure 5:
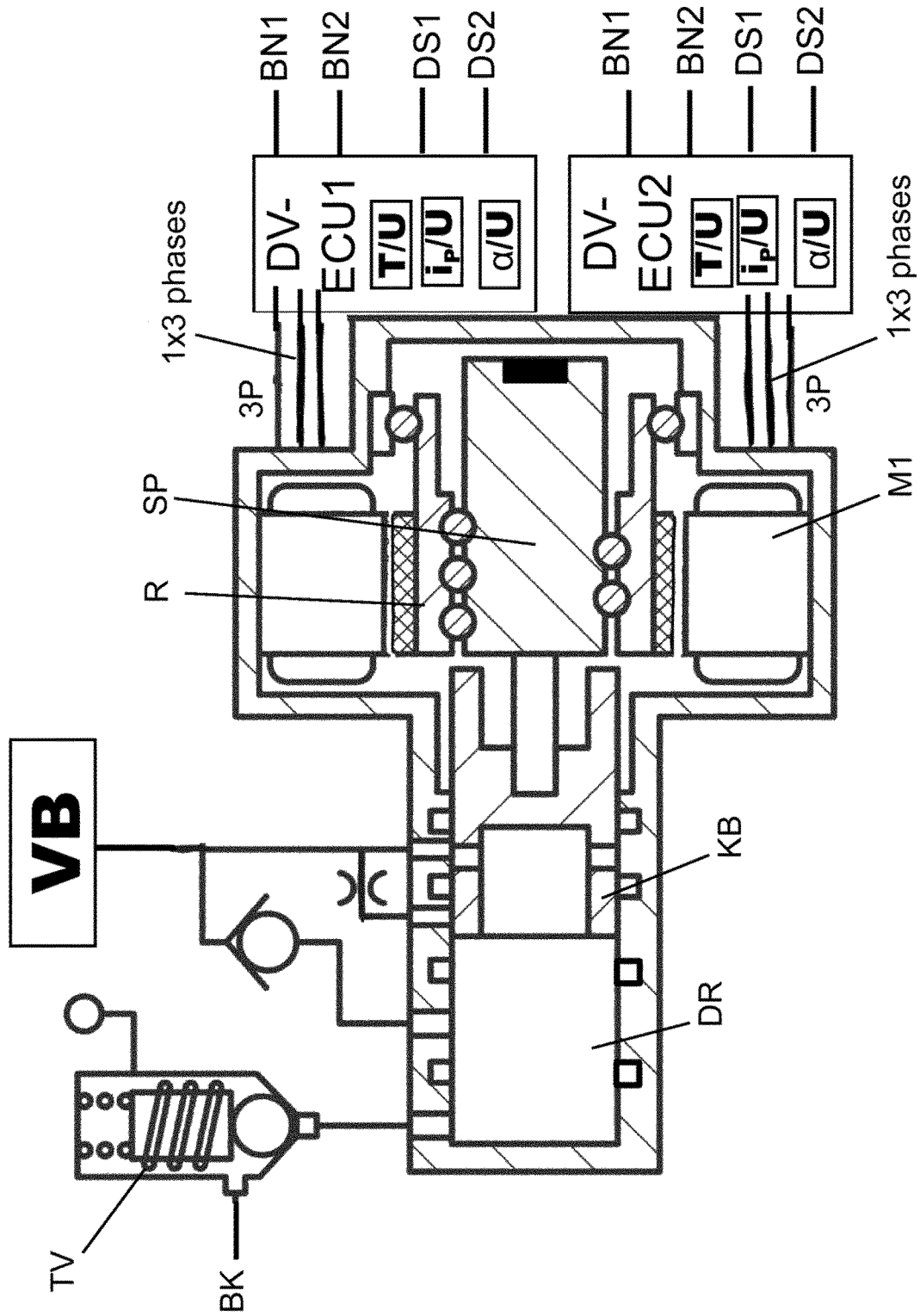
Figure 6A:
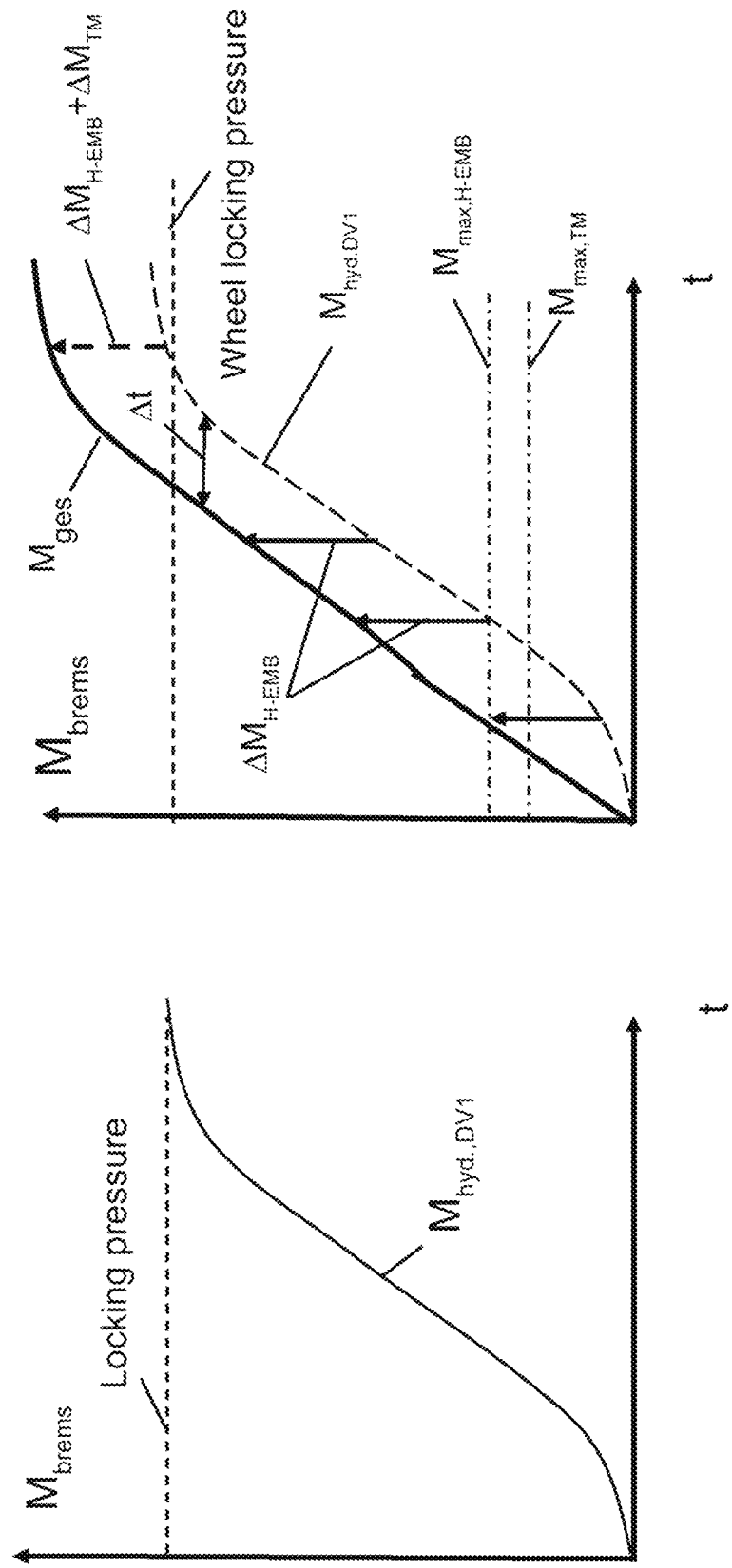
Figure 6B:
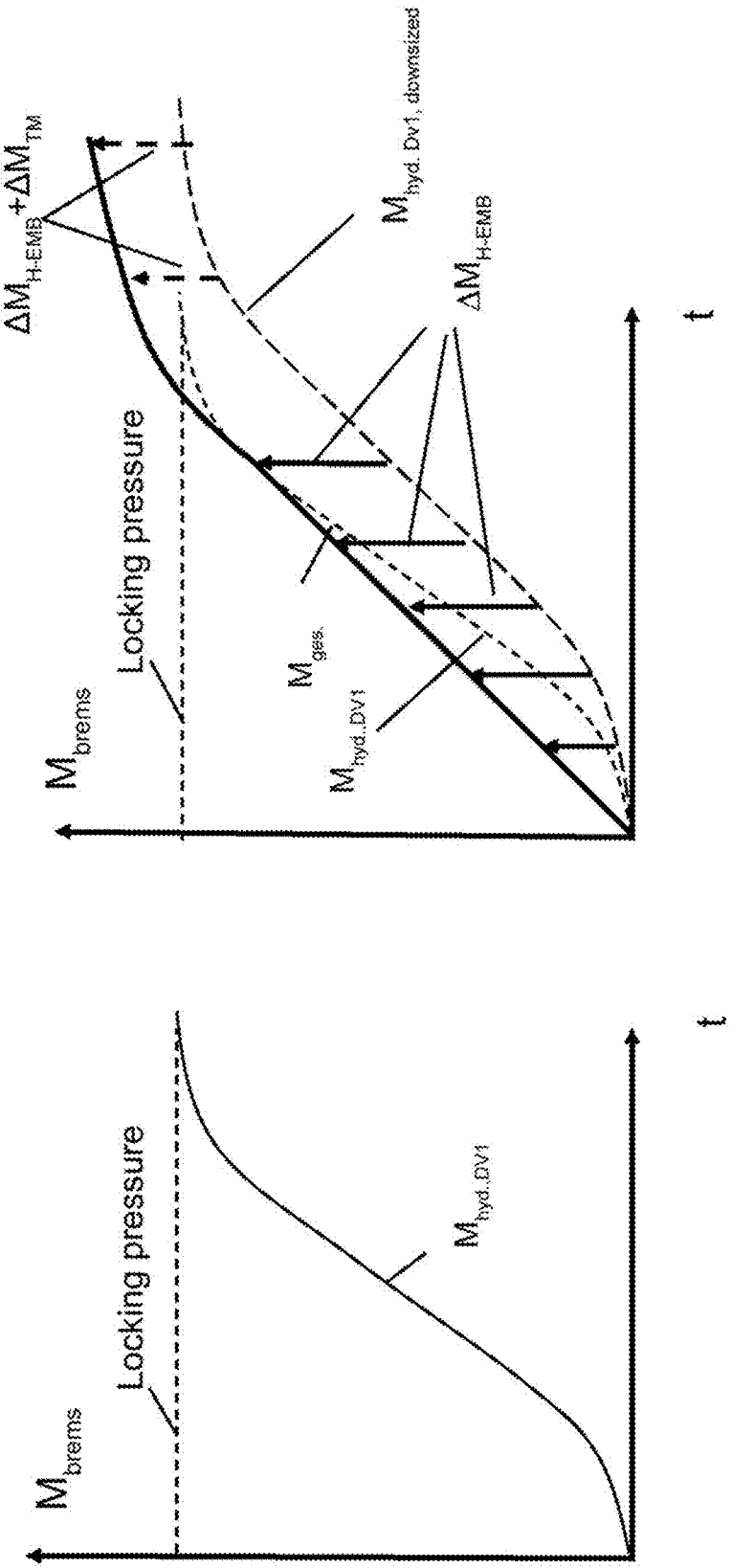
Figure 6C:
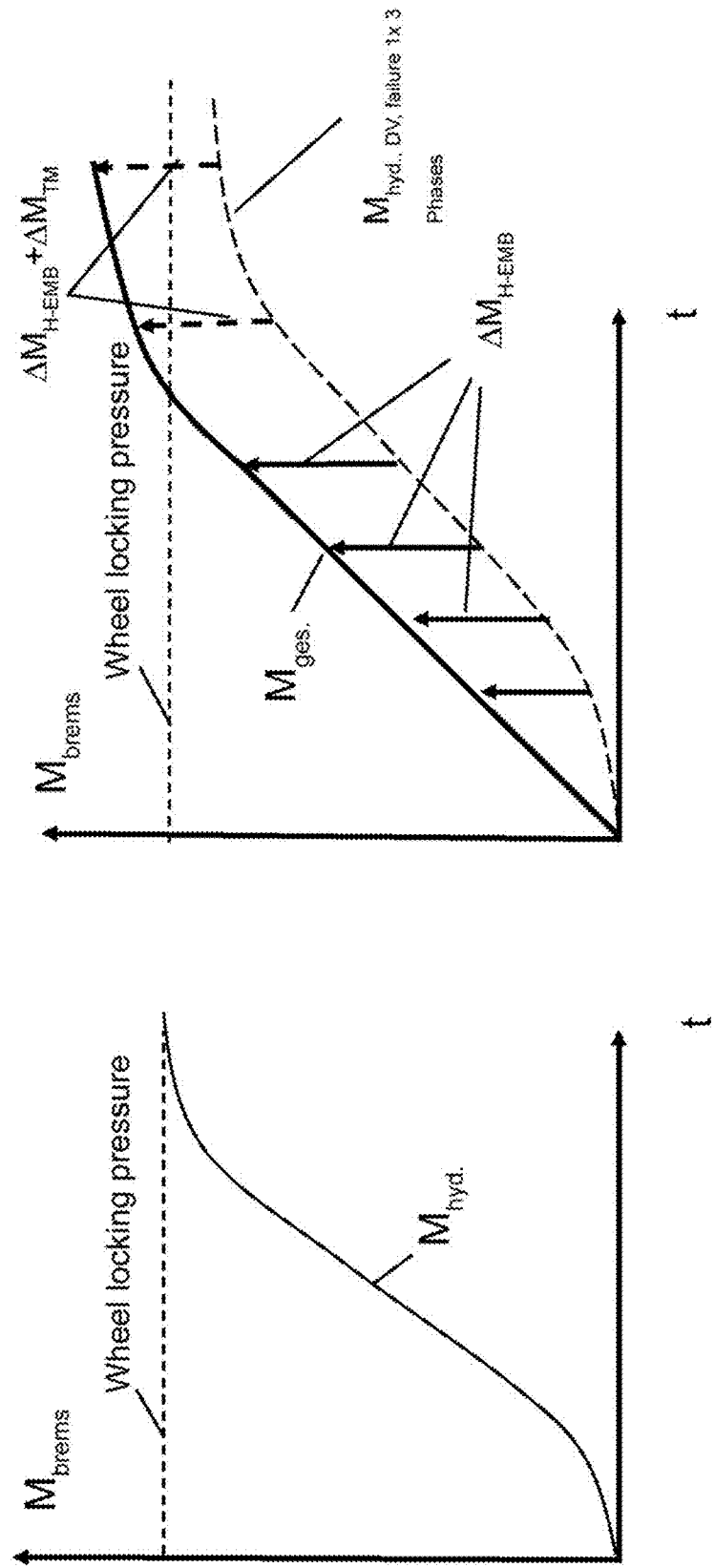
Figure 6D:
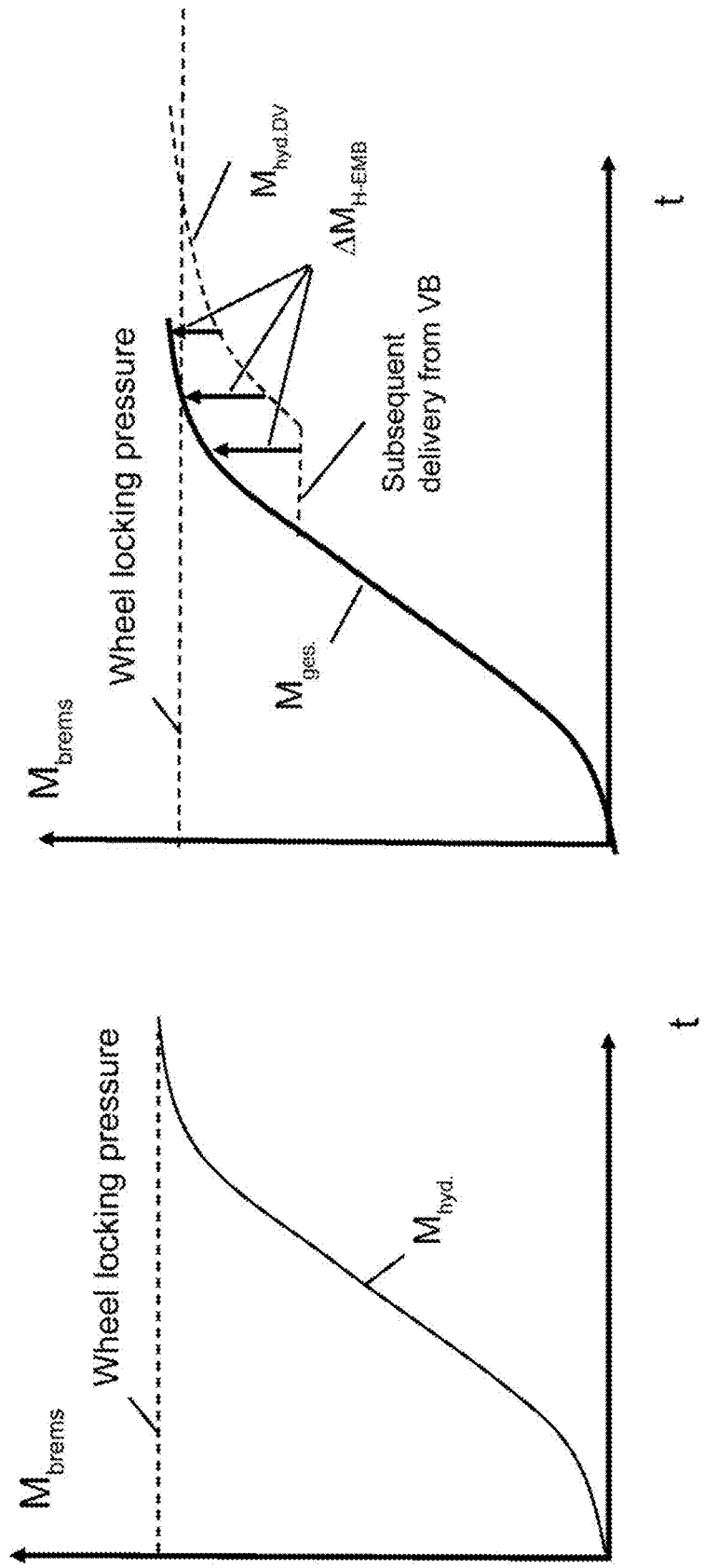
Figure 6E:
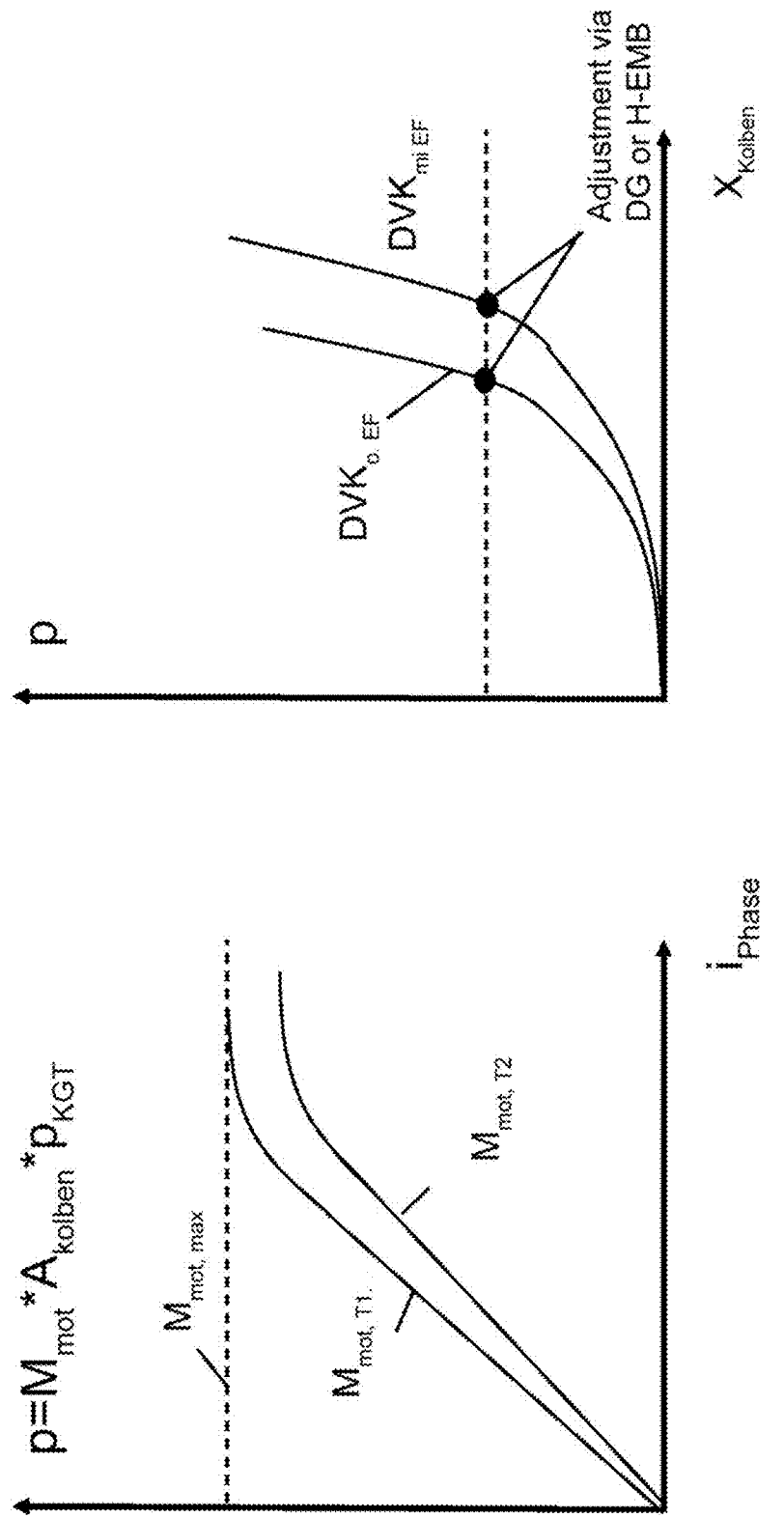
Figure 9B:
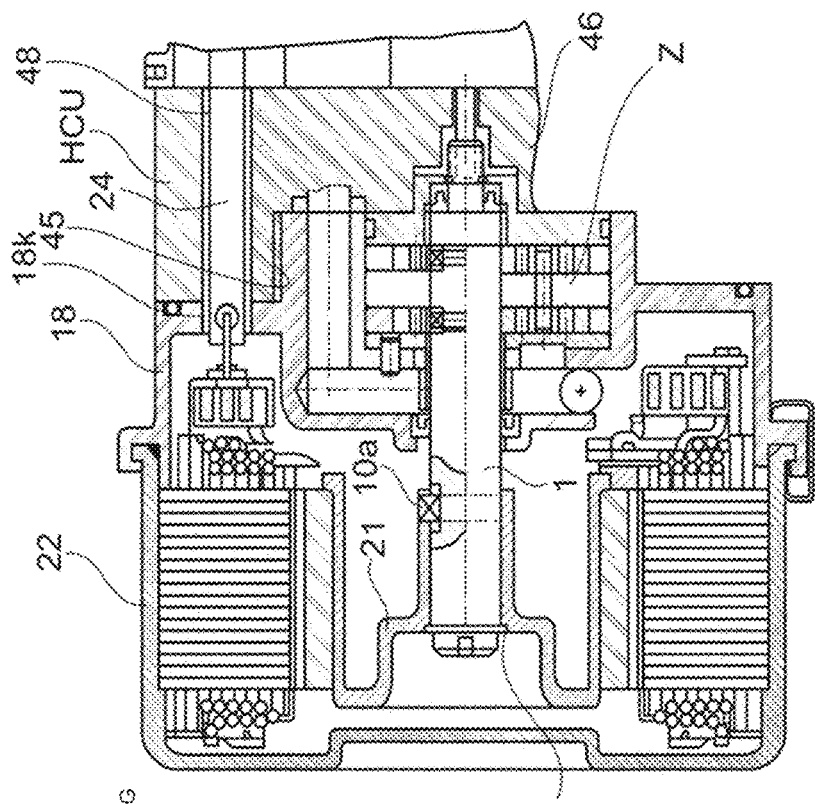
Figure 9A:
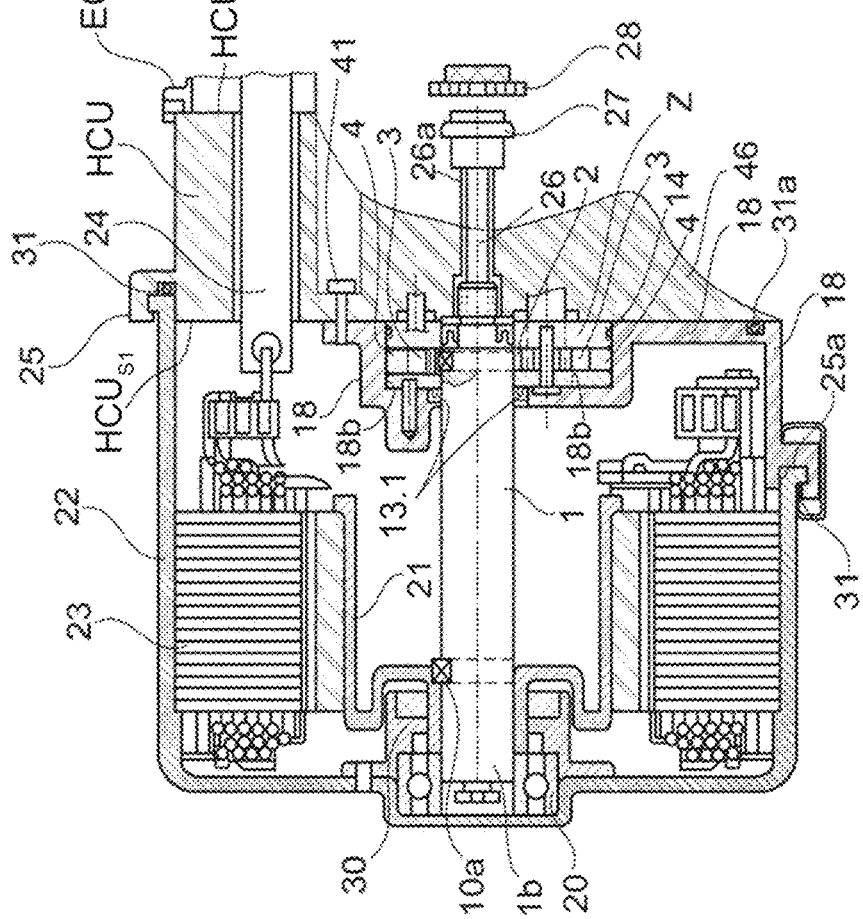

In the figures:

FIG. 1: shows a schematic representation of a first embodiment of the braking system according to the invention with an electric parking brake on the rear axle, electric drive motors TM1 and TM2 on the front and rear axles and a pressure supply device with solenoid valves, control and regulating devices in a pressure control module assembly, the assembly with 4 wheel brakes and an actuating unit (BE) is hydraulically connected, FIG. 1*a*: shows a basic circuit diagram of a first possible embodiment of the braking system according to FIG. 1;

FIG. 2: shows a schematic representation of a second possible embodiment of the braking system according to the invention with the difference to the braking system according to FIG. 1 being that hydraulically supported electromechanical brakes are arranged on the rear axle;

FIG. 2*a*: shows a basic circuit diagram of the braking system according to FIG. 2;

FIG. 3: shows a schematic representation of a third possible embodiment of the braking system according to the invention with a pressure supply device for the front axle, an electromechanical brake being provided on the rear axle for each wheel;

FIG. 3*a*: shows a basic circuit diagram of the braking system according to FIG. 3;

FIG. 4*a*: shows a cross-sectional representation through a hydraulically supported electromechanical brake;

FIG. 4*b*: shows a basic circuit diagram of possible valve circuits and their function for reducing pressure in a wheel brake;

FIG. 4*c*: shows an actuating device with associated piston-cylinder unit for building up pressure in a brake circuit;

FIG. 5: shows a pressure supply device with two control and regulating devices;

FIG. 6*a*: shows torque diagrams to show the braking force support by means of hydraulically supported electromechanical brakes and traction motors;

FIG. 6*b*: shows torque diagrams to show the downsizing possibility of the pressure supply device, provided that braking force support is provided by means of hydraulically supported electromechanical brakes and traction motors;

FIG. 6*c*: shows torque diagrams to show the braking force support by means of hydraulically supported electromechanical brakes and traction motors in emergency operation in the event of failure of components of the braking system;

FIG. 6*d*: shows torque diagrams to show the braking torque curve during the demand for brake fluid with the braking force support by means of hydraulically supported electromechanical brakes and traction motors;

FIG. 6*e*: shows a brake pressure control in the event of failure of the pressure sensor by means of current measurement and evaluation of the pressure-volume characteristic curve;

FIG. 7: Table 1: shows the effect of major faults on operational strategy;

Figure 8:
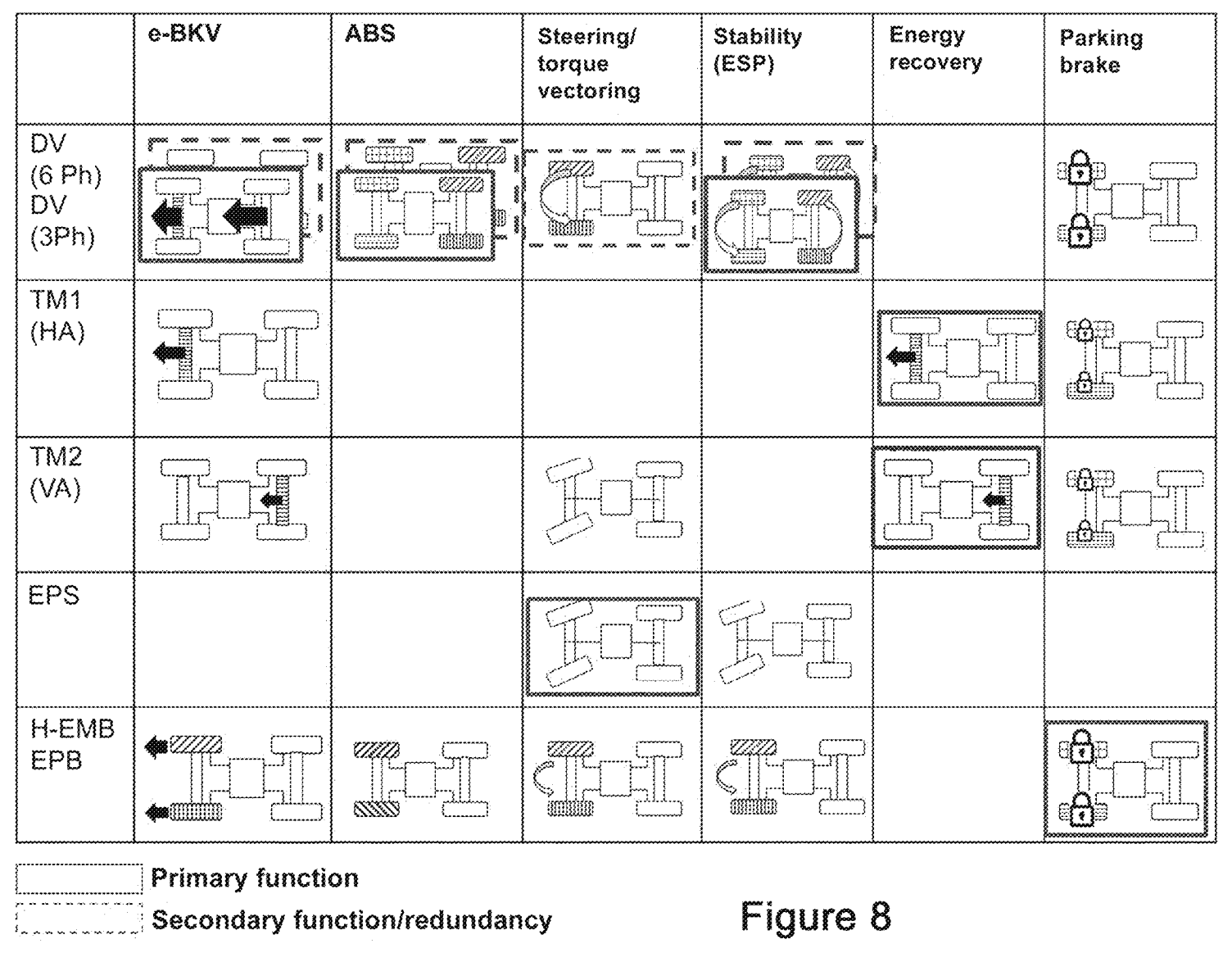

FIG. 8: Table 2: shows primary function and secondary function/redundancy;

FIG. 9*a*: shows a unit consisting of electric motor 22, single-circuit rotary pump Z, HCU with solenoid valves and ECU FIG. 9*b*: shows a unit consisting of electric motor 22, two-circuit rotary pump Z, HCU with solenoid valves and ECU FIG. 1 shows a first possible embodiment of the braking system according to the invention with a pressure supply device DV1, an actuating device BE, a superordinate control and regulating unit M-ECU, and two wheel brakes RB1 and RB2 arranged on the front axle VA, and a rear axle HA on which two wheel brakes RB3 and RB4 and additional electric parking brakes EPB are also arranged. A traction motor TM1 and TM2 is arranged on both the front and rear axles. The pressure supply device DV1 has two independent control and regulating units DV-ECU1 and DV-ECU2, each of which controls one of the two winding or phase systems of the drive motor of the pressure supply device DV1, which are formed here by 3-phase systems. In addition, redundant signal lines DS1 and DS2 can be provided.

The pressure supply device DV1 also has a valve device R-HCU in which switching valves are provided for connecting or disconnecting the pressure supply device DV1 to the wheel brakes. The dashed lines represent signal transmission lines which connect the control unit M-ECU to the components of the braking system.

FIG. 1a shows a basic circuit diagram of a first possible embodiment of the braking system according to FIG. 1. The vehicle has a front axle VA and a rear axle HA. A conventional hydraulic wheel brake RB1, RB2 is arranged on each wheel on the front axle. In addition, a traction motor TM1 together with its control unit TM-ECU is arranged on the front axle VA, wherein the traction motor TM1 can be used both for driving and for braking the front axle VA.

On the rear axle HA, both a conventional, hydraulically acting wheel brake RB3, RB4 and an electric parking brake EKB are arranged on each wheel. A traction motor TM2 with associated control electronics TM-ECU is also arranged on the rear axle HA, which, like the traction motor TM1 on the front axle VA, can be used both to drive and to brake the rear axle HA.

A pressure supply device DV1, which has an electric-motor drive M1, which is controlled by the control and regulating device DV-ECU, is used to build up pressure in the hydraulically acting wheel brakes RB1-RB4. In addition, the pressure supply device DV1 can also have a motor current measuring device i/U, at least one temperature sensor T/U and a rotor angle sensor α/U, the signals of which can be used for pressure control. The motor M1 drives a piston KB via a spindle drive, which is displaceably mounted in a cylinder of the pressure supply device DV1 and delimits a pressure chamber in order to build up, maintain or reduce pressure there. The pressure chamber is connected to a separating valve TV and a hydraulic line HL5 via the hydraulic line HL10. The pressure in the hydraulic line HL5 or HL10 can be determined by means of the pressure transducer p/U. The pressure control can take place with the help of the pressure transducer p/U. The pressure control can also be carried out by measuring the current by means of the motor current measuring device i/U and the angle sensor α/U and a stored pressure-volume characteristic, since the motor torque is proportional to the pressure in the pressure chamber and also proportional to the motor current i. The motor M1 has two separate winding systems with 2×3 phases. Of course, the number of phases can be changed according to the respective requirements. If a winding system fails, the motor M1 can still be operated with reduced power. This already creates a substantial redundancy. The control and regulating device DV-ECU can also be designed redundantly, so that, for example, an independent control and regulating device DV-ECU1 and DV-ECU2 can be provided, each of which controls a phase system of the motor M1. Thus, even if an control and regulating device DV-ECU1 or DV-ECU2 fails, the braking system can still be operated safely.

By means of a separating valve TV, the pressure supply device DV1 can optionally be connected to or separated from the hydraulic line HL6 or the first brake circuit BK1. The hydraulic lines HL1 and HL2, which are connected to the wheel brakes, can optionally be connected to the hydraulic line HL6 by means of switching valves SV1 and SV2. If a pressure is now to be built up in the wheel brake RB1 of the front axle VA, this is done via open valves TV and SV1, with the valves AV1, SV2 and FV being closed and the piston KB being adjusted by means of the motor M1. To reduce the pressure in the wheel brake RB1, the piston KB can be retracted with the same valve switching or the outlet valve AV1 is opened, whereby the pressure in the wheel brake RB1 can be reduced into the reservoir VB. The pressure build-up in the wheel brake RB2 takes place in the same way. Of course, the pressure in the wheel brakes RB1 and RB2 can also be built up and reduced simultaneously. It is also possible to build up pressure in one wheel brake by means of the pressure supply device DV1 and, at the same time, to reduce the pressure in the other wheel brake via the associated outlet valve AV. If the pressure only builds up in the wheel brakes RB3 and RB4 of the second brake circuit BK2, either the separating valve TV and/or the switching valves SV1 and SV2 must be closed and the respective switching valve SV3 or SV3 must be open. Should the pressure supply device DV1 fail, the actuating device BE can be used to build up pressure in one or both brake circuits. For this purpose, the actuating device BE has a brake pedal which acts on a piston delimiting the pressure chamber, the piston then pressing hydraulic medium from the pressure chamber into the brake circuit(s), whereby a brake pressure is built up in one or all of the wheel brakes. For this purpose, the switching valves are preferably designed as de-energized open valves.

Electromechanical brakes EMB are also arranged on the wheels of the rear axle, by means of which a braking torque can be built up via their drive, which braking torque can be used as a support or as a replacement for pressure control. A braking torque can also be applied to the axles VA and HA by means of the traction motors TM1 and TM2. This can also have a supportive effect in the case of high dynamics required or as a replacement or supplement in the event of a total failure or partial failure of the pressure control by means of the pressure supply device DV1. A superordinate control and regulating device M-ECU controls the individual component controls TM-ECU, DV-ECU and R-HCU (valve control)

FIG. 2 shows a schematic representation of a second possible embodiment of the braking system according to the invention with the difference to the braking system according to FIG. 1 being that, instead of additional electromechanical brakes, hydraulically supported electromechanical brakes are arranged on the rear axle. If the hydraulically supported electromechanical brakes H-EMB are designed accordingly, the conventional RB3 and RB4 wheel brakes may also be dispensed with. The pressure in the hydraulically supported brakes H-EMB is controlled by the pressure supply device DV1.

FIG. 2a shows the basic circuit diagram of the braking system according to FIG. 2. This differs from that in FIG. 1a only in a few points. For example, one outlet valve AV is provided here for each brake circuit. Otherwise, the regulation and control of the braking system takes place analogously to that shown and described in FIG. 1a. Reference is therefore made in this respect to FIG. 1a and its description.

FIG. 3 shows a schematic representation of a third possible embodiment of the inventive braking system with a pressure supply device DV1 for the front axle VA, with only one electromechanical brake EMB per wheel as wheel brake RB3 and RB4 being provided on the rear axle HA and each rear wheel having its own traction motor TM1, TM2 can be driven and also braked. Here, too, two separate control and regulating devices DV-ECU1 and DV-ECU2 are provided, each of which controls separate winding systems (1×3 PH) of the drive motor of the pressure supply device DV1. Additionally or alternatively, a redundant power supply can be provided for the control and regulating devices and/or the valve control R-HCU. For example, they can be connected to two different vehicle electrical systems BN1 and BN2, as shown, so that if one vehicle electrical system fails, a power supply is still ensured via the other vehicle electrical system BN.

FIG. 3a shows the basic circuit diagram of the braking system according to FIG. 3. With this system, outlet valves AV can be dispensed with, since the pressure reduction can also take place quickly via the de-energized open valves SV1, SV2 and TV through the pressure chamber of the pressure supply device DV1 to the reservoir VB.

FIG. 4a shows a cross-sectional view through a hydraulically supported electromechanical brake H-EMB, which can be connected to the pressure supply device DV1 via a hydraulic connection HL-DV1, so that a force can be applied to the brake disks either via the hydraulics and/or the electric motor EM. The rotary movement of the electric motor is transferred into a linear movement via a gear G and produces the force $F_{EM}$ on the wheel brake. The transmission G is preferably designed to be self-locking, so that the parking brake functions safely when the vehicle electrical system fails. In addition to the electric motor, a hydraulic force $F_{hyd}$ is produced via the pressure supply. Depending on the embodiment of the EM as a brush motor or a brushless motor with lower or higher power, the dynamics of the braking torque change and the additionally available braking torque can be determined by the H-EMB by appropriate design of the components and matched to the hydraulic brake.

FIG. 4b shows a possible valve circuit and its function for regulating pressure in the four wheel brakes RB1 to RB4 corresponding to the valve circuit of FIG. 2a. The pressure build-up and pressure reduction in the wheel brakes RB1 and RB3 takes place via the pressure supply device DV1 when the switching valves SV1 or SV3 are open with pressure as the control variable, preferably supported by the PPC method, e.g., by suitable pilot control or, if a pressure transducer is not available, exclusively by the PPC method, The pressure build-up in the wheel brakes RB2 and RB4 also takes place with the switching valve SV2 or SV4 open via the pressure supply device DV1, preferably also with the PPC method, with the pressure reduction in these wheel brakes alternatively via the assigned outlet valves AV1, AV2 in the reservoir VB or via the open switching valve SV2 or SV4 in the PPC method. A pressure build-up in the wheel brakes is thus also possible, with a pressure reduction taking place at the same time in a wheel brake RB2 or RB4 via the associated outlet valve AV1 or AV2. A combination of the PPC method with PWM control is also a possible control method. The switching valves SV2 and SV4 or only one switching valve SV2 or SV4 are open or one switching valve or both switching valves are clocked using the PWM method and outlet valve AV1 and/or AB2 is either open or is also clocked. This method is an alternative to the known multiplex method, where switching valves are opened or closed digitally and the pressure reduction takes place sequentially or simultaneously and is based on the method in DE 102015103858. The outlet valves AV1 and AV2 can also be positioned differently, as in FIG. 1a, they can be assigned to the wheel brakes of an axle or a brake circuit. Control is carried out in the same way as described above.

FIG. 4c shows an embodiment of an actuating device BE with brake pedal 1, tappet 2, piston 3, cylinder 5 and pedal feel simulator 6 for building up pressure in one or more brake circuit(s) BK1 and/or BK2. The piston 3, which has 3 seals x in the cylinder 5, is moved to the left by the brake pedal 1 via the tappet 2, whereby a pressure builds up in the pressure chamber 4 or a pressure volume is delivered via the hydraulic line HL into the brake circuits BK1/BK2. In addition, redundant seals in the cylinder and parallel hydraulic lines to the reservoir are provided between the seals, one seal having a throttle. The failure of a seal can thus be reliably diagnosed and there is a reliable actuation system with pedal feel simulator and sealing system with multiple redundancy as well as the possibility of pressure production if the electromotive pressure supply device fails.

FIG. 5 shows a possible embodiment of a pressure supply device DV1 with two control and regulating devices DV-ECU1 and DV-ECU2. The pressure supply device has an electric motor M1, the rotor R of which adjusts a spindle SP which is connected to a piston KB. By adjusting the piston KB, a pressure can be built up in the pressure chamber DR, which can be passed into a brake circuit BK via the separating valve TV. The piston is sealed by a plurality of seals in the cylinder, a redundant, diagnosable sealing system being created as with the actuating unit. In the pressure supply device, too, a hydraulic line leads to the reservoir between the seals. This means that the pressure supply is still fully operational and redundant even if a seal fails. The pressure chamber DR is connected to the reservoir via a check valve. Thus, the pressure supply can subsequently deliver. Each of the two control and regulating devices DV-ECU1 and DV-ECU2 are connected via 1×3 phase lines with separate winding or phase systems of motor M1, so that if one control and regulating device or winding system fails, motor M1 still has the other winding or phase system and the other control and regulating device can be operated, even if only about half the torque can then be produced by means of the drive M1. One or both control and regulating device(s) has or have sensors for determining the temperature T, the motor current i and the rotor angle α of the electric motor. To achieve a high level of availability, not only are the control and regulating devices DV-ECU redundant, but also power supplies BN1, BN2 and data and control lines DS1 and DS2 are provided twice. The power supplies BN1 and BN2 can, for example, be different voltage levels of a vehicle electrical system or separate vehicle electrical systems.

FIG. 6a shows torque diagrams to show the braking force support by means of hydraulically supported electromechanical brakes H-EMB and traction motor TM. The diagram on the left shows the torque curve $M_{hyd,DV1}$, which can be achieved solely by means of the pressure supply device DV1. The diagram on the right shows the torque curve as can be achieved by adding the hydraulically supported electromechanical brake H-EMB and a traction motor TM. A maximum torque $M_{max, H-EMB}$ of H-EMB or $M_{max, TM}$ of the traction motor is available. With the braking torque $M_{max, TM}$ additionally produced by the traction motor TM and the braking torque $\Delta M_{H-EMB}$ produced by means of the H-EMB, the locking pressure (horizontal dashed line) is reached earlier by the time period $\Delta t$. A significantly larger braking torque can also be produced.

FIG. 6b shows the possibility of downsizing the pressure supply device DV1, provided that the braking effect of the hydraulically supported brake (H-EMB) according to FIG. 4a is included in the pressure control. The pressure supply device DV1 should not be reduced in terms of its maximum pressure that can be built up, but rather in terms of its dynamics, with which the electric motor can be produced more cheaply.

FIG. 6c shows torque diagrams to show the braking force support by means of hydraulically supported electromechanical brake H-EMB and traction motor TM in emergency operation in the event of failure of a winding or phase system 1×3 phases of the drive M1. By eliminating a winding system, the pressure supply DV1 can no longer build up the required pressure build-up up to the blocking pressure and is also no longer dynamic enough. By using the hydraulically supported electromechanical brake H-EMB and the traction motor(s), the required dynamics and the required brake pressure can be built up (right diagram).

FIG. 6d shows torque diagrams to illustrate the braking torque curve $M_{brems}$ during the subsequent delivery of brake fluid. No further brake pressure can be built up by means of the pressure supply device DV1 during the subsequent delivery from the reservoir VB. With the addition of the braking torque $M_{max,\ TM}$ of the traction motor TM and the braking torque $\Delta M_{H-EMB}$ produced by the H-EMB the braking torque $M_{brems}$ can be further increased during the subsequent delivery, whereby the dynamics of the system are greatly improved.

FIG. 6e shows a brake pressure control in the event of a failure of the pressure transducer DG, with a control of the motor torque $M_{Mot}$ and thus the control of the pressure p being carried out by measuring the motor current $i_{phase}$ and evaluating the pressure-volume characteristic. The motor temperature T is also taken into account, since the torque constant is reduced under temperature and thus has an influence on the proportionality factor kt*(1-Br %*$\Delta T$) between motor torque $M_{Mot}$ and motor current $i_{phase}$. This advantageously results in a redundancy of the pressure measurement. This also means that a pressure transducer can be dispensed with. The control is calibrated by the pressure transducer and it is primarily controlled with current, path and pressure volume characteristic.

Where $$M_{mot} = kt * i_{phase} * (1 - Br\ \% * \Delta T)$$

kt: torque constant
Iphase: phase current
$\Delta T$: temperature change in k
Br %: typical Br=kt drop with increasing temperature FIG. 9a shows a representation of an entire structural unit consisting of motor 22, pump Z, HCU and ECU, which is able to exercise pressure control and control for systems such as brakes, transmissions, etc. The main focus here is on the combination of motor and pump. The pump is arranged in the bearing flange 18 or attached to the HCU or ECU in a separate pump housing 40, as shown in the upper half of the figure. In FIG. 9a a version is shown which requires an additional motor bearing 20 in which the shaft 1 is mounted. As is usual, the motor is composed of a rotor 21, which is connected to the shaft 1 via the driver 10a. The rotor 21 is axially pretensioned by its force via a permanent magnet in the housing 30. This is a solution for the motor manufacturer who manufactures and tests the motor with housing 22 and stator and winding 23 and delivers it to the system supplier. The motor is tested with an auxiliary shaft without a pump. Thereafter, when the shaft is removed, the rotor is centered by the axial magnetic force, so that the shaft 1 can then be assembled with the rotor during final assembly. The drive housing must also be joined and fastened here with the flange 18 at 25a—shown in the lower half of the figure— e.g., with springs, which are attached in segments over three connections. A housing seal 31 is also necessary here. It can be fastened by caulking, at 25 from the engine flange with HCU or ECU, see upper half of the FIG. 28. The pump version with pump housing is shown here. The motor is shown here as a brushless motor that needs a motor sensor for commutation and control of the volume delivery of the pump. This motor sensor is arranged at a distance from the drive housing 22, a sensor shaft 26, which is arranged or attached to the drive shaft 1, carrying a sensor target 27. This target 27 acts on the sensor element 28, which is arranged on the circuit board of the ECU. The winding is connected to the ECU via contact bars 24.

The motor with bearing flange 18 can be connected directly to the hydraulic housing HCU, which includes valves or other hydr. components to be connected to the pump. If this is not the case, a connection of the drive housing 22, 18 directly to the housing of the ECU is possible.

It is also possible to arrange the gear pump Z in a pump housing 40 which is connected directly to the hydraulic housing HCU, as is shown in FIG. 9a in the upper half of the drive shaft 1. Before the assembly of the pump housing and the hydraulic housing HCU or the pump housing 40 and the ECU, the gear pump Z is first integrated into or mounted in the pump housing 40, the rotor 21 then being pressed onto the shaft 1 and then assembled with the bearing 20. Here, the tensile force of the magnet 30 can also act on the rotor 21 and the bearing 20, so that the bearing acts like a four-point bearing. The motor housing 22 is thus connected to the gear pump Z and its pump housing and, in the next step, can be connected to the hydraulic housing HCU or the electronics housing ECU. The fastening screw 41 is used for this. The shaft 1 is previously centered in the outer disks 7.1 and 7.2, so that the pump housing 40 is centered with the shaft 1 before the screw connection to the hydraulic housing HCU or the electronics housing ECU.

The pressure supply device according to FIG. 9b uses a 2-stage pump with a long sliding or rolling bearing, which does not require a separate motor bearing. Accordingly, the motor structure with the housing is simplified. The rotor 21 is seated with the driver 10a on the motor shaft and is axially connected to the locking ring. The pump housing protrudes slightly into the HCU here.

The invention claimed is:

1. A braking system for a vehicle, comprising the following components:
   an electrohydraulic braking system including a pressure supply device, an electronic control and regulating device, and a valve assembly with valves for wheel-specific pressure regulation in two hydraulically operated wheel brakes of a front axle of the vehicle,
   an electromechanical wheel brake or a hydraulically supported electromechanical wheel brake for each wheel of a rear axle of the vehicle,
   at least one electric traction motor configured to drive or brake at least one axle or wheel of the vehicle,
   a superordinate control unit configured to control the braking of the electric traction motor, the electrohydraulic braking system of the front axle, and the electromechanical wheel brakes or hydraulically supported electromechanical wheel brakes of the rear axle,
   wherein the superordinate control unit is configured to control the braking system such that, for generating a yaw moment or steering intervention by means of the wheel brakes and/or the at least one traction motor, different braking torques are generated at the axles for brake force distribution and/or at the wheels of an axle, and such that the yaw moment or steering intervention is enabled to be maintained even in an event of complete or partial failure of modules, components or signal lines.

2. The braking system according to claim 1,
   wherein the braking system further includes a piston-cylinder unit and an actuating device in the form of a brake pedal, wherein the piston-cylinder unit is able to be actuated by the actuating device, and wherein the piston-cylinder unit is connected or is connectable to the hydraulically operated wheel brakes of a front axle of the vehicle;

and/or wherein that the at least one electric traction motor has a power of at least 30 kW;

and/or wherein the braking system further includes an electric parking brake.

3. The braking system according to claim 1, wherein one or more components or their subcomponents of the braking system are configured redundantly, wherein in an event of partial or complete failure of a primary braking device, braking force is enabled to be generated at at least one axle or at least one wheel by means of still-functional components of the primary braking device, an actuating device, and/or at least one brake unit.

4. The braking system according to claim 1, wherein the pressure supply device includes a piston-cylinder unit, whose piston is adjusted for pressure regulation in the wheel brakes by an electromotive drive via a gearing.

5. The braking system according to claim 1, wherein the pressure supply device includes a rotary pump that is adjusted for pressure regulation in the wheel brakes by an electromotive drive.

6. The braking system according to claim 1, wherein the electronic control and regulating device includes a two-fold redundant pressure supply device control and regulating unit arranged to control an electromotive drive of the pressure supply device and/or wherein the at least one traction motor has redundant motor windings.

7. The braking system according to claim 6, wherein the two-fold redundant control and regulating unit includes two separate control and regulating units, each of the two separate electronic control and regulating units controlling separate windings or winding systems of the electromotive drive of the pressure supply device such that in an event of a failure of one of the two electronic control and regulating units or of a first one of the winding systems, a torque is still able to be generated via a second one of the winding systems of the electromotive drive of the pressure supply unit.

8. The braking system according to claim 7, wherein the pressure supply device, together with the valve assembly and at least one of the separate electronic control and regulating units, are combined into a module or assembly.

9. The braking system according to claim 1, wherein at least one of the wheel brakes, a hydraulically supported electromechanical brake, an electric parking brake, or an electromechanical brake has a braking effect on at least one wheel associated with the at least one of the wheel brakes, or wherein, in addition to the at least one of the wheel brakes, an additional parking brake or electromechanical brake has a braking effect on the at least one wheel.

10. The braking system according to claim 1, wherein the superordinate control unit is configured to control the pressure supply device, the valves, the at least one electric traction motor, and/or at least one of the electromechanical brakes or hydraulically-supported electromechanical brakes during a braking process and/or anti-lock braking (ABS) control operation and/or for diagnosis of the braking system.

11. The braking system according to claim 1, wherein the hydraulically supported electromechanical brake is connectable to the pressure supply device via a hydraulic line, wherein a hydraulic force is produced by pressure build-up or pressure reduction by the pressure supply device, wherein an electric motor and a non-hydraulic transmission device additionally produce a force on the hydraulically supported electromechanical brake, and both forces act on a brake disk simultaneously or independently of one another.

12. A vehicle dynamics system including the braking system according to claim 1, wherein the vehicle dynamics system is configured to control, by means of the superordinate control unit of the braking system, the at least one electric traction motor and/or an electric power steering, as well as at least one of the hydraulically supported electromechanical wheel brake(s) or at least one electric parking brake for dynamic control functions of the vehicle, including steering intervention, and/or wherein the vehicle dynamics system is configured to control the braking system, by means of the superordinate control unit of the braking system, such that a combined use of at least two of the pressure supply device, the hydraulically supported electromechanical brake(s), the electric parking brake(s), the electromechanical brake(s), or the traction motor(s) is carried out in normal operation or in the event of a failure of one or more components of the braking system.

13. A vehicle incorporating the braking system according to claim 1.

14. A method for operating a braking system according to claim 1, comprising:

controlling, axle-wise or wheel-individually, a deceleration of the wheels by means of the pressure supply device and the at least one electric traction motor or the hydraulically supported electromechanical brake(s) or the electromechanical brake(s), wherein a yaw moment or steering intervention is carried out by means of the pressure supply device or the at least one electric traction motor or the hydraulically supported electromechanical brake(s) or the electromechanical brake(s), or using the pressure supply device, the hydraulically supported electromechanical brake(s), one or more electric parking brake(s), the electromechanical brake(s), or the electric traction motor(s) in combination in normal operation or in the event of a failure of one or more components of the braking system.

15. The method according to claim 14, wherein the deceleration of the wheels is carried out axle-specifically by means of the pressure supply device and simultaneously with the at least one traction motor, such that recuperation and electronic braking force distribution are implemented simultaneously with different braking torques on the axles.

16. The method according to claim 14, wherein braking torques at the wheels are generated wheel-individually by means of the pressure supply device to provide supporting yaw moments for steering interventions in addition to electric power steering, or in an emergency case of a failure of electric power steering, to ensure steerability;

or wherein braking torques at the wheels are generated wheel-individually by means of the pressure supply device traction motors to generate yaw moments for steering interventions to steer a vehicle without electric power steering.

17. A braking system for a vehicle, comprising the following components:

an electrohydraulic braking system including a pressure supply device, an electronic control and regulating device, and a valve assembly with valves for wheel-specific pressure regulation in two hydraulically operated wheel brakes of a front axle of the vehicle, an electromechanical wheel brake or a hydraulically supported electromechanical wheel brake for each wheel of a rear axle of the vehicle,
at least one electric traction motor configured to drive or brake at least one axle or wheel of the vehicle,
a superordinate control unit configured to control the braking of the electric traction motor, the electrohydraulic braking system of the front axle, and the electromechanical wheel brakes or hydraulically supported electromechanical wheel brakes of the rear axle,
wherein the superordinate control unit is configured to control the braking system such that a combined use of the pressure supply device, hydraulically supported electromechanical brake or electromechanical brake, at least one traction motor, or at least one electric parking brake is carried out in an event of a failure of one or more components of the braking system to generate and maintain a yaw moment or steering intervention.

* * * * *